(12) United States Patent
Eadie et al.

(10) Patent No.: US 9,797,291 B2
(45) Date of Patent: Oct. 24, 2017

(54) FLANGE ASSEMBLY AND RELATED METHODS OF CONNECTING TWO EXHAUST PIPES TOGETHER WITH A FLANGE ASSEMBLY

(71) Applicant: Hoerbiger FineStamping Inc., Waterloo, Ontario (CA)

(72) Inventors: Wayne Eadie, Ontario (CA); Jay Church, Ontario (CA); John Trihenea, Ontario (CA)

(73) Assignee: Hoerbiger Finestamping Inc. (CA)

( * ) Notice: Subject to any disclaimer, the term of this patent is extended or adjusted under 35 U.S.C. 154(b) by 285 days.

(21) Appl. No.: 14/664,340

(22) Filed: Mar. 20, 2015

(65) Prior Publication Data
US 2016/0273440 A1    Sep. 22, 2016

(51) Int. Cl.
*F16L 23/00* (2006.01)
*F01N 13/18* (2010.01)
*F16L 23/026* (2006.01)

(52) U.S. Cl.
CPC ..... *F01N 13/1805* (2013.01); *F01N 13/1827* (2013.01); *F01N 13/1855* (2013.01); *F16L 23/026* (2013.01); *F01N 2450/24* (2013.01); *Y10S 285/917* (2013.01); *Y10T 29/49398* (2015.01); *Y10T 403/642* (2015.01); *Y10T 403/645* (2015.01)

(58) Field of Classification Search
CPC ............. F01N 13/1805; F01N 13/1855; F01N 13/1827; F01N 2450/24; F16L 23/02; Y10T 29/49398; Y10T 403/642; Y10T 403/645; Y10S 285/917

USPC ...... 285/368, 412, 917; 29/890.08; 403/336, 403/337
See application file for complete search history.

(56) References Cited

U.S. PATENT DOCUMENTS

| 612,455 | A | | 10/1898 | Gore | |
|---|---|---|---|---|---|
| 1,468,187 | A | * | 9/1923 | Werbeck | F16L 23/162 285/917 |
| 1,715,854 | A | * | 6/1929 | McKenzie-Martyn | F16L 23/20 285/917 |
| 2,944,842 | A | | 7/1960 | Stiff | |
| 4,192,621 | A | * | 3/1980 | Barth | F16B 31/043 403/337 X |
| 4,336,958 | A | | 6/1982 | Goetzinger | |
| 4,890,889 | A | * | 1/1990 | Burgett | B60B 35/14 |
| 7,198,303 | B2 | | 4/2007 | Brophy, III et al. | |
| 8,181,453 | B2 | * | 5/2012 | Goplen | F01N 13/1805 |

(Continued)

FOREIGN PATENT DOCUMENTS

DE    4214515 A1    11/1993

*Primary Examiner* — Gregory Binda
(74) *Attorney, Agent, or Firm* — Hayes Soloway PC

(57) ABSTRACT

A flange assembly and related methods of connecting two exhaust pipes together with a flange assembly are provided. The flange assembly includes a first flange having a first mating face and a second flange connected to the first flange, wherein the second flange has a second mating face. A sealing structure is formed with the mating faces of the first and second flanges, wherein the sealing structure comprises a groove positioned on the first mating face and a ridge positioned in the second mating face, wherein the ridge occupies at least a portion of the groove with the first flange connected to the second flange.

20 Claims, 21 Drawing Sheets

(56) References Cited

U.S. PATENT DOCUMENTS 8,777,278 B2 7/2014 Singh et al.
2007/0137022 A1* 6/2007 Haller ................. F01N 13/1805

* cited by examiner

FLANGE ASSEMBLY AND RELATED METHODS OF CONNECTING TWO EXHAUST PIPES TOGETHER WITH A FLANGE ASSEMBLY

FIELD OF THE DISCLOSURE

The present disclosure is generally related to flanges and more particularly is related to a flange assembly and related methods of connecting two exhaust pipes together with a flange assembly.

BACKGROUND OF THE DISCLOSURE

Joint and flange assemblies are used in many different fields, such as within the automotive industry to connect automotive exhaust pipes together to form exhaust systems. FIG. 1 is an isometric view illustration of a flange assembly 10, in accordance with the prior art. FIG. 2 is a cross-sectional view illustration of a flange assembly 10, in accordance with the prior art. With reference to FIGS. 1-2, the flange assembly 10 includes two flanges 12, 14, which are engaged together with a fastener 16, such as a bolt and nut. Two lengths of exhaust pipe 20, 22 or tube are connected together using the flange assembly 10. For example, exhaust pipe 20 is welded or otherwise affixed to one flange 12, whereas exhaust pipe 22 is welded or otherwise affixed to the other flange 14. The flange assembly 10 keeps the exhaust pipes 20, 22 in contact together, thereby allowing exhaust gases to move through the exhaust pipes 20, 22 and out of the exhaust system.

These conventional exhaust flanges have many shortcomings. For one, the cost to manufacture automotive exhaust flanges is increasingly becoming a critical factor in the manufacture of car parts. Manufacturers are striving to reduce their costs by reducing the labor or material expenses associated with manufacturing the flanges. Another shortcoming that manufacturers face is the ability to manufacture products that are able to meet required emission standards over a predetermined period of time, such as during a warrantee period of a car. As a result, individual parts within the exhaust system, such as exhaust flanges, must be manufactured to ensure full operation during the warranty period, which can be a very difficult task.

Another problem faced by manufacturers of exhaust flanges is damage of the products due to corrosion, such as due to external corrosion from the elements. For example, flanges are in almost constant exposure to the elements, including high heat followed by moisture, water, snow, and/or ice quenching in high saline conditions. Most conventional exhaust flanges are manufactured entirely using standard carbon steel or stainless steel, but both of these materials have inherent disadvantages. Stainless steel exhaust flanges have adequate corrosion resistance but are costly to produce and therefore, the cost of replacing stainless steel exhaust flanges is relatively high. On the other hand, carbon steel exhaust flanges are cost-effective but typically corrode quickly and, as a result, are difficult to service within the warranty period.

Exhaust flanges can also be damaged by the exhaust gases themselves which can cause the flanges to bind and corrode, which makes the flange or the exhaust system difficult to service. For example, the fasteners used to connect flanges may be subject to long periods of exhaust gas exposure, which causes a build-up of foreign materials on the threads of the fasteners and makes them difficult to remove. As a result, service to exhaust systems involving disassembly can often require cutting of the exhaust pipes and in some cases necessitate unnecessary replacement of catalytic converters and/or mufflers.

Thus, a heretofore unaddressed need exists in the industry to address the aforementioned deficiencies and inadequacies.

SUMMARY OF THE DISCLOSURE

Embodiments of the present disclosure provide a flange assembly. Briefly described, in architecture, one embodiment of the system, among others, can be implemented as follows. The flange assembly includes a first flange having a first mating face. A second flange is connected to the first flange, wherein the second flange has a second mating face. A sealing structure is formed with the mating faces of the first and second flanges, wherein the sealing structure comprises a groove positioned on the first mating face and a ridge positioned in the second mating face, wherein the ridge occupies at least a portion of the groove with the first flange connected to the second flange.

The present disclosure can also be viewed as providing an exhaust flange apparatus. Briefly described, in architecture, one embodiment of the apparatus, among others, can be implemented as follows. A first flange has a central aperture, wherein a first exhaust pipe is connectable to the first flange with a central axis of the first exhaust pipe positioned substantially concentric with a central axis of the central aperture. A second flange has a central aperture, wherein a second exhaust pipe is connectable to the second flange with a central axis of the second exhaust pipe positioned substantially concentric with a central axis of the central aperture of the second flange. A sealing structure is interfaced between mating faces of the first and second flanges, wherein the sealing structure has a groove positioned on one of the first and second flanges and a ridge positioned on another of the first and second flanges, wherein the sealing structure is positioned at least partially around the central aperture of the first and second flanges. At least one fastener is connecting the first and second flanges.

The present disclosure can also be viewed as providing methods of connecting two exhaust pipes together with a flange assembly. In this regard, one embodiment of such a method, among others, can be broadly summarized by the following steps: connecting a first exhaust pipe to a first flange having a first mating surface, wherein a central aperture of the first flange is substantially concentric with the first exhaust pipe; connecting a second exhaust pipe to a second flange having a second mating surface, wherein a central aperture of the second flange is substantially concentric with the second exhaust pipe; inserting a ridge positioned on the second mating surface into a groove positioned in the first mating surface; and fastening the first flange to the second flange with at least one fastener.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
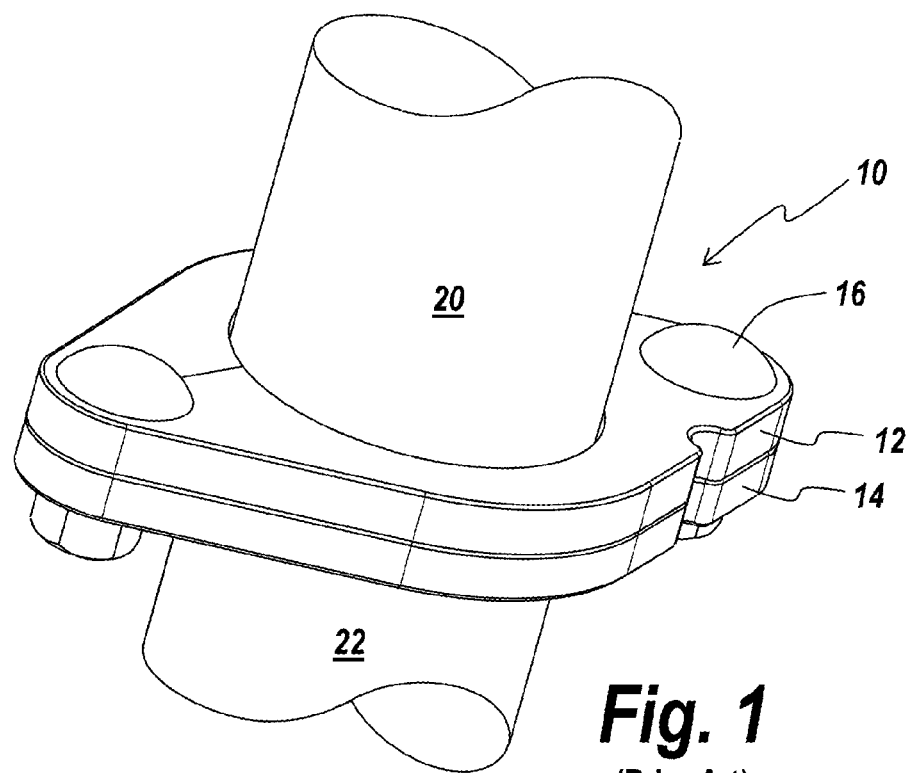
FIG. 1 is an isometric view illustration of a flange assembly, in accordance with the prior art.
Figure 2:
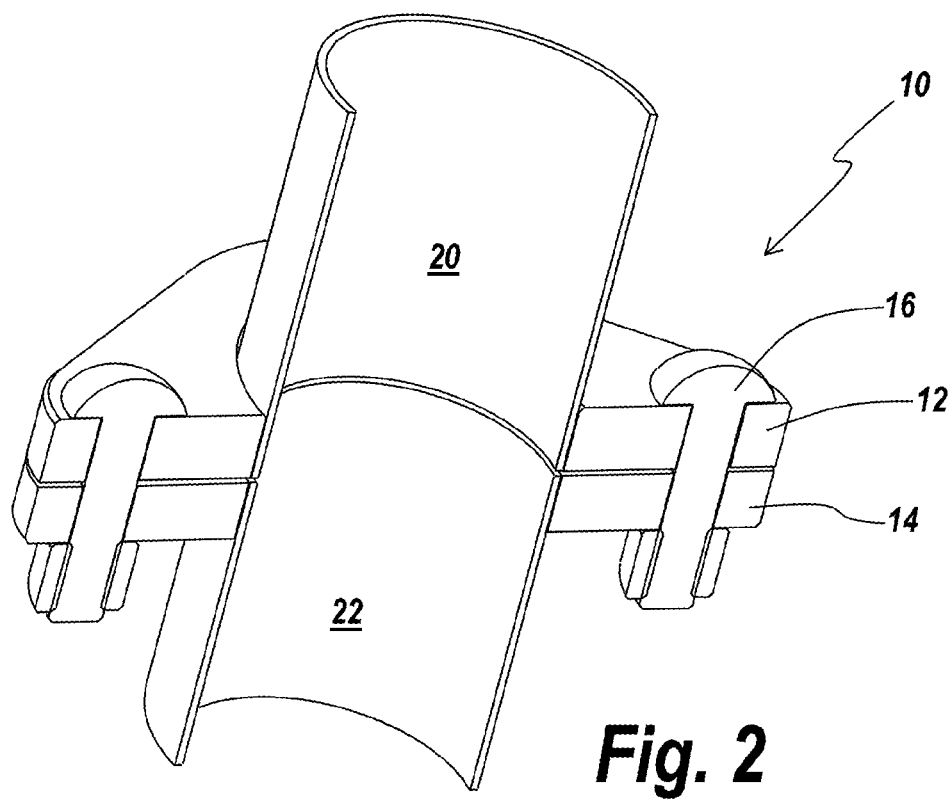
FIG. 2 is a cross-sectional view illustration of a flange assembly, in accordance with the prior art.
Figure 3:
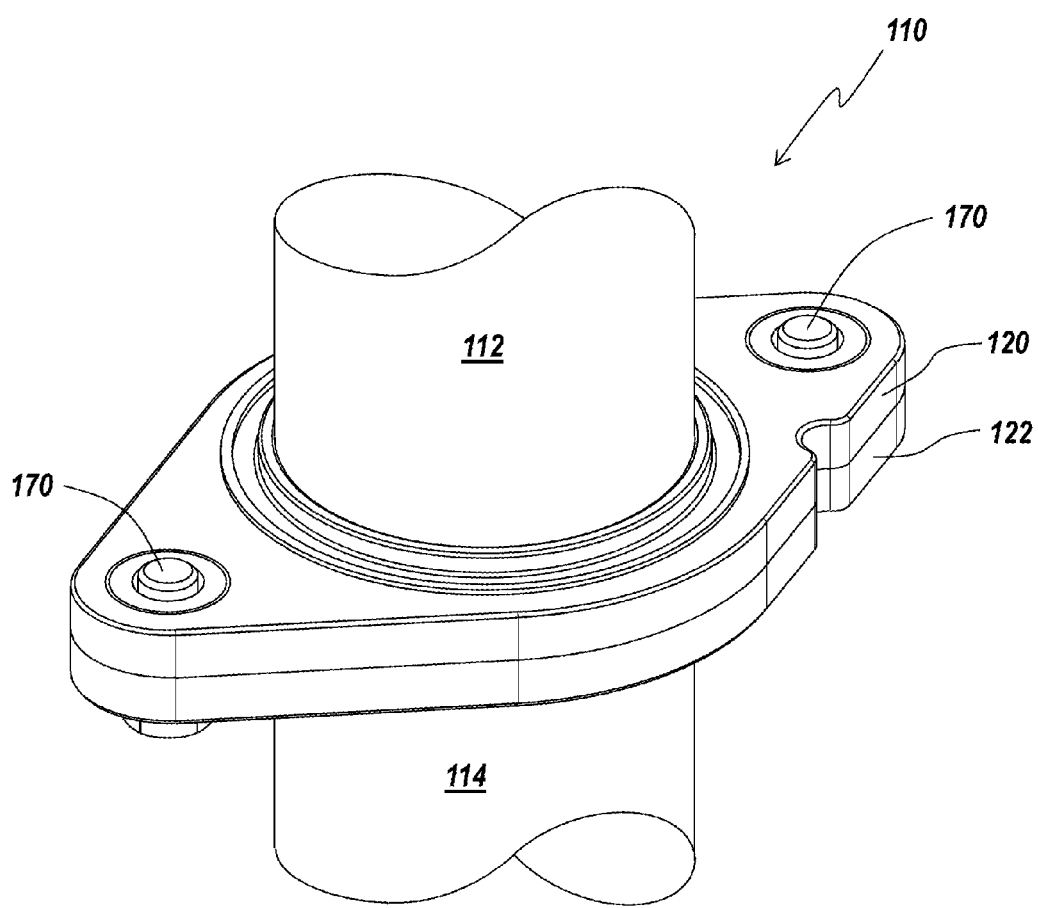
FIG. 3 is an isometric view illustration of a flange assembly, in accordance with a first exemplary embodiment of the present disclosure.
Figure 4:
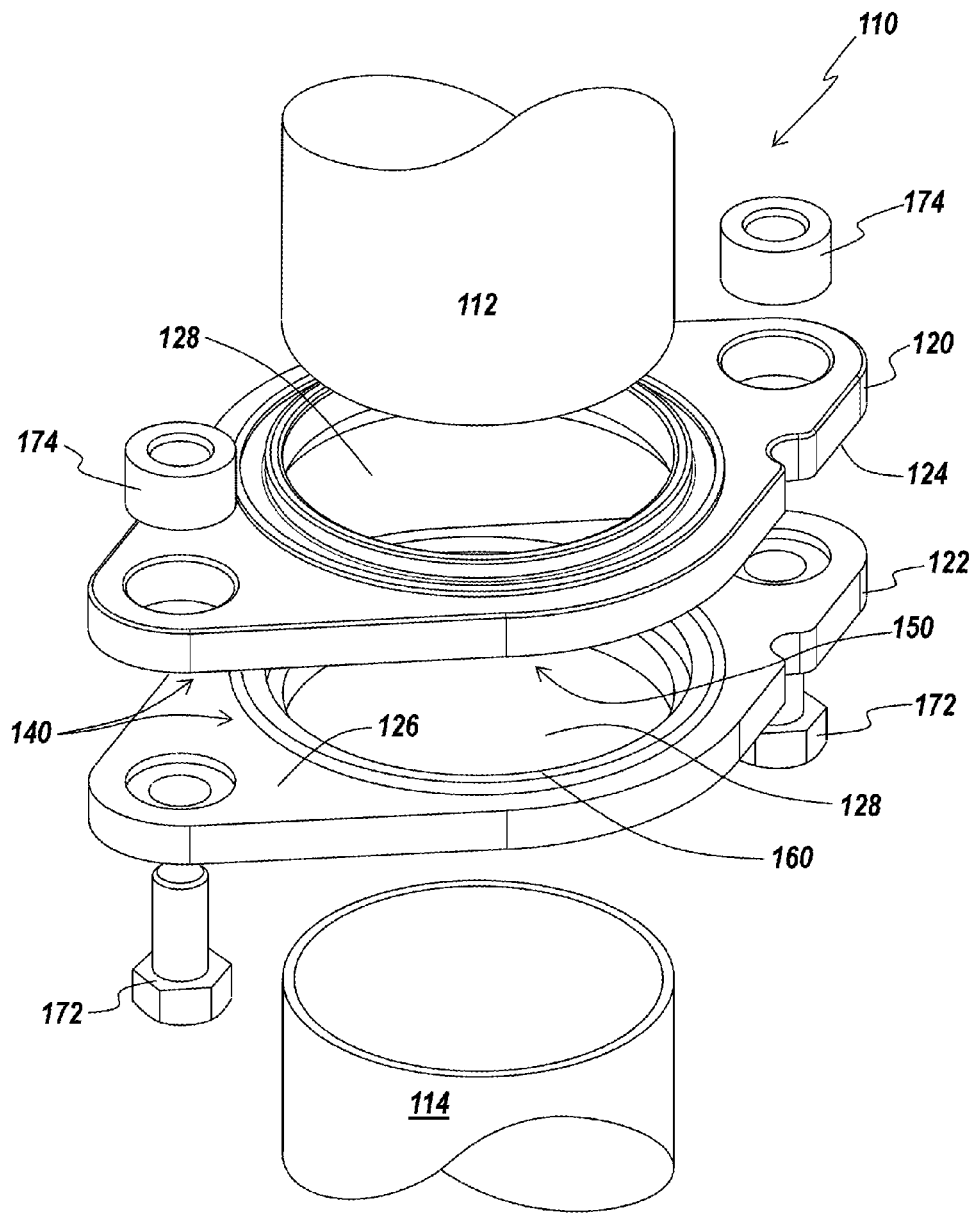
FIG. 4 is an exploded isometric view illustration of the flange assembly of FIG. 3, in accordance with the first exemplary embodiment of the present disclosure.

FIG. 3 is an isometric view illustration of a flange assembly 110, in accordance with a first exemplary embodiment of the present disclosure. FIG. 4 is an exploded isometric view illustration of the flange assembly 110 of FIG. 3, in accordance with the first exemplary embodiment of the present disclosure. With reference to FIGS. 3-4, the flange assembly 110, which may be referred to herein as 'assembly 110', includes a first flange 120 and a second flange 122. A sealing structure 140 is positioned between a first mating faces 124 and a second mating face 126 of the first and second flanges 120, 122. The sealing structure 140 comprises a groove 150 positioned on the first mating face 124 and a ridge 160 positioned in the second mating face 126. The ridge 160 engages with the groove 150 by occupying at least a portion of the groove 150 when the first and second flanges 120, 122 are connected.

The flange assembly 110 may be used in a variety of different industries to connect piping or tubing together. For example, the flange assembly 110 may be used within the automotive industry to connect automotive exhaust pipes together to form exhaust systems of cars. The flange assembly 110 generally uses two flanges, e.g., the first and second flanges 120, 122, which are each connected to exhaust pipe 112, 114. The exhaust pipes 112, 114 may be affixed to each of the first and second flanges 120, 122, respectively, such that retaining the first and second flanges 120, 122 together can retain the exhaust pipes 112, 114 together, or substantially together. At least one fastener 170, commonly two fasteners 170 as shown, is connected between the first and second flanges 120, 122 and may hold the first and second flanges 120, 122 together in an engaged position. The fastener 170 commonly includes a threaded bolt 172 and a receiving structure 174, as identified in FIG. 4. The first and second flanges 120, 122 and the fasteners 170 may be constructed from a variety of materials that are durable enough to be used within the environments required by exhaust systems, or other systems requiring the flange assembly 110.

The sealing structure 140 is positioned between the first mating face 124 and the second mating face 126, such that it can act as a seal between the first and second flanges 120, 122. In accordance with this disclosure, the first mating face 124 and the second mating face 126 may be characterized as the faces of the first and second flanges 120, 122 which are positioned in abutment or near abutment when the flange assembly 110 is assembled. It is noted that commonly, the first and second mating faces 124, 126 will be in planar or substantially planar contact with one another, but contact between the first and second mating faces 124, 126 may not be required. The sealing structure 140 provides a seal between the first and second flanges 120, 122 through the use of the groove 150 positioned on the first flange 120 and the ridge 160 positioned in second flange 122, or vice-versa. The ridge 160 may engage with the groove 150 when the first and second flanges 120, 122 are engaged together, such that the first and second mating faces 124, 126 are positioned in close enough contact to allow engagement of the groove 150 and the ridge 160.

While FIGS. 3-4 depict a sealing structure 140 which is encircling the central aperture 128 of each of the first and second flanges 120, 122, it is noted that the sealing structure 140 can be positioned partially or fully about the central aperture 128 of the first and second flanges 120, 122. For example, the sealing structure 140 can be positioned partially about the central aperture 128 when it is positioned only in an area of the first and second flanges 120, 122 proximate to the fasteners 170. FIGS. 3-4 illustrate the sealing structure 140 being positioned fully about the central aperture 128. It is noted that a plurality of sealing structures 140 can be used within one flange assembly 110. In this situation, there may be a plurality of grooves 150 positioned on the first flange 120 and a plurality of ridges 160 positioned in second flange 122, wherein each of the plurality of grooves 150 and ridges 160 engages together, respectively. Using a plurality of sealing structures 140 may allow the flange assembly 110 to have enhanced sealing capabilities or redundant sealing capabilities in case there is a failure of one of the sealing structures 140. Further, it may be possible to have a plurality of sealing structures 140 where each one is positioned about a different portion of the central aperture 128, e.g., such that each sealing structure 140 is positioned a different distance away from the central aperture 128 than another sealing structure 140. All variations are considered to be within the scope of the present disclosure.

Figure 5:
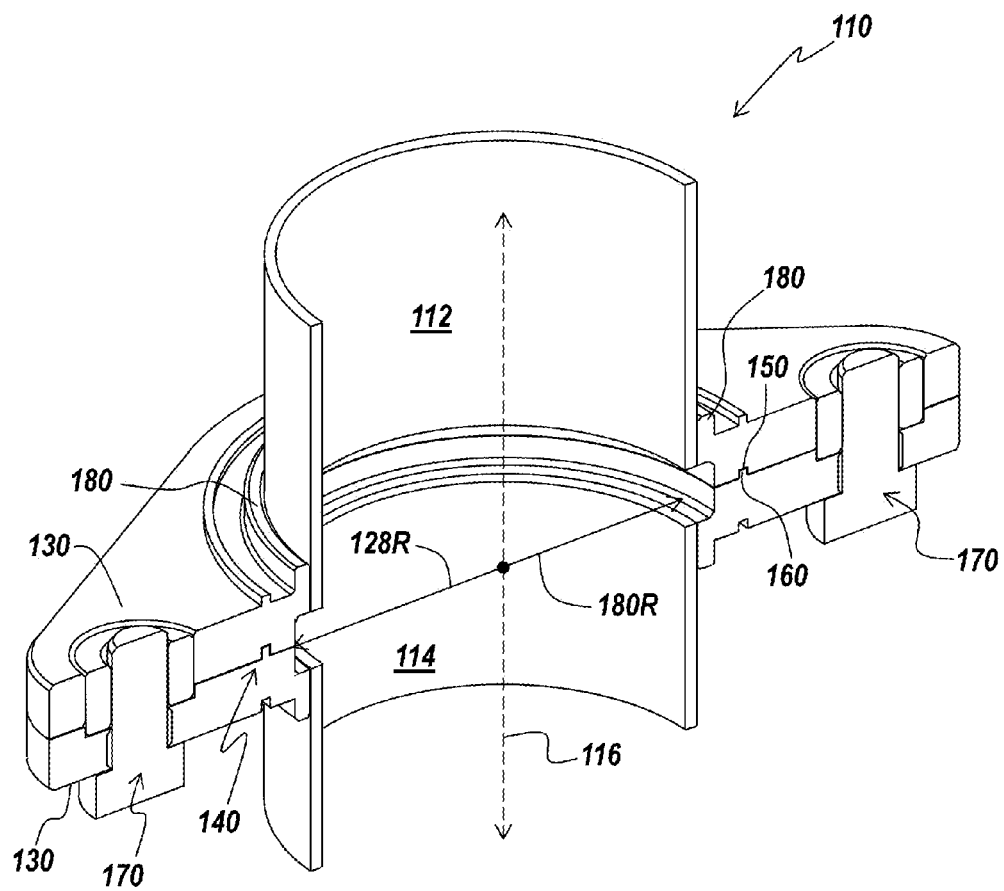
FIG. 5 is a cross-sectional isometric view illustration of the flange assembly of FIG. 3, in accordance with the first exemplary embodiment of the present disclosure.

FIG. 5 is a cross-sectional isometric view illustration of the flange assembly 110 of FIG. 3, in accordance with the first exemplary embodiment of the present disclosure. As is shown in FIG. 5, the groove 150 and ridge 160 of the sealing structure 140 may allow for a seal to be formed between the exhaust pipes 112, 114, such that exhaust gases traveling through exhaust pipes 112, 114 cannot escape or leak out of the flange assembly 110. Accordingly, the seal may be a gas-tight seal formed by the mating of the groove 150 and the ridge 160 encapsulating a portion of the central aperture 128. Thus, the use of the sealing structure 140 may substantially increase the ability of the exhaust system to properly expel the exhaust gases without experiencing leaks therein. These leaks within the exhaust system can be pollutant in nature and can often be detrimental to the health of occupants within a cabin of a car if the exhaust leak is emitted into the cabin.

As shown in FIG. 5, the each of the first and second flanges 120, 122 may include a tubular extension 180 positioned on a non-mating face 130 of each of the first and second flanges 120, 122. The tubular extension 180 may allow for a better weld to be created between an end of the exhaust pipes 112, 114 and the flange assembly 110, which increases the integrity of the flange assembly 110 while reducing its weight, such as, for example, by reducing the weld size. A reduction in weld size and the ability of the tubular extension 180 to locate the weld a slight distance from the non-mating face 130 of the first and second flanges 120, 122 may promote a reduction in residual stresses which are known to cause distortion in flanges. The tubular extension 180 may be positioned between the central aperture 128 and the sealing structure 140, as is shown in FIG. 5 and/or it may form an innermost portion of the first and second flanges 120, 122. It is also noted that a radial dimension 180R of the tubular extension 180 may be sized less than a radial dimension 128R of the central aperture 128, as is shown in FIG. 5 relative to the central axis 116, which may allow connection of the exhaust pipes 112, 114 with the first and second flanges 120, 122 without interfering with the engagement of the first and second flanges.

With reference to FIGS. 3-5, the fastener 170, or plurality thereof, may each include the threaded bolt 172 and receiving structure 174, such as a threaded nut. Depending on the type of receiving structure 174 used, the first and second flanges 120, 122 may include a counterbore hole (shown in FIGS. 4-5), such that the nut is able to be positioned, at least partially, within the counterbore hole. The receiving structure 174 may also be formed by in-die tapping within one of the first and second flanges 120, 122. FIGS. 7-10 illustrate the first and second flanges 120, 122 for use with either receiving structures using counterbore holes or in-die tapping.

It is noted that each of the first and second flanges 120, 122 may each have the groove 150 positioned on one side thereof and the ridge 160 positioned on the other side thereof. This configuration of the groove 150 and ridge 160 positioned on either side of the first and second flanges 120, 122 may allow for universal use of either the first or second flanges 120, 122. Due to the fact that the first and second flanges 120, 122 are each capable of providing either the groove 150 or ridge 160, the ease and efficiency of installing the flange assembly 110 may be increased. In other words, workers would not have to predetermine that they have mating flanges 120, 122 since either the first or second flanges 120, 122 would be capable of being used for either the groove 150 or the ridge 160 of the sealing structure 140.

It is further noted that each of the first and second flanges 120, 122 may have a variety of dimensions and material specifications. Relative to dimension, the first and second flanges 120, 122 may have a thickness dimension of not more than 7.0 mm. A thickness dimension of 7.0 mm or less may provide a significant improvement over conventional flange systems which are commonly 8.0 mm in thickness. When the fastening hardware is considered, a thickness of 7.0 mm versus 8.0 mm may provide for a 15% weight reduction in the flange assembly 110 over conventional devices. In another example, the tubular extension 180 may have a thickness dimension that substantially matches a wall thickness of the exhaust pipe connected thereto. Matching the thicknesses may minimize welding requirements and heat distortion of the flange assembly 110.

Figure 6:
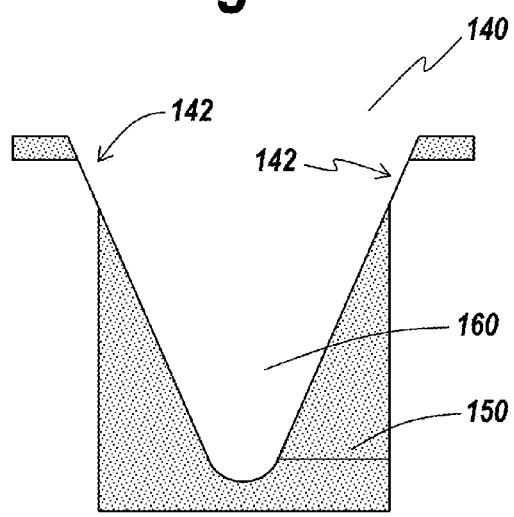
FIG. 6 is a cross-sectional schematic illustration of the sealing structure of the flange assembly of FIG. 3, in accordance with the first exemplary embodiment of the present disclosure.

FIG. 6 is a cross-sectional schematic illustration of the sealing structure 140 of the flange assembly 110 of FIG. 3, in accordance with the first exemplary embodiment of the present disclosure. As is shown in FIG. 6, the ridge 160 of the sealing structure 140 may fit within the groove 150 of the sealing structure 140 to allow for a sealed engagement therebetween. In FIG. 6, the ridge 160 is illustrated as a descending pointed structure which engages with a substantially square groove 150, however a variety of different shapes, geometric structures, and/or sizes of the groove 150 and ridge 160 may be used. FIG. 6 illustrates a connection point 142 between the ridge 160 and the groove 150 which creates a sealed interface. These two connection points 142, or a single connection point 142 as the case may be, can successfully prevent exhaust gases from passing through the sealing structure 140.

Figure 7:
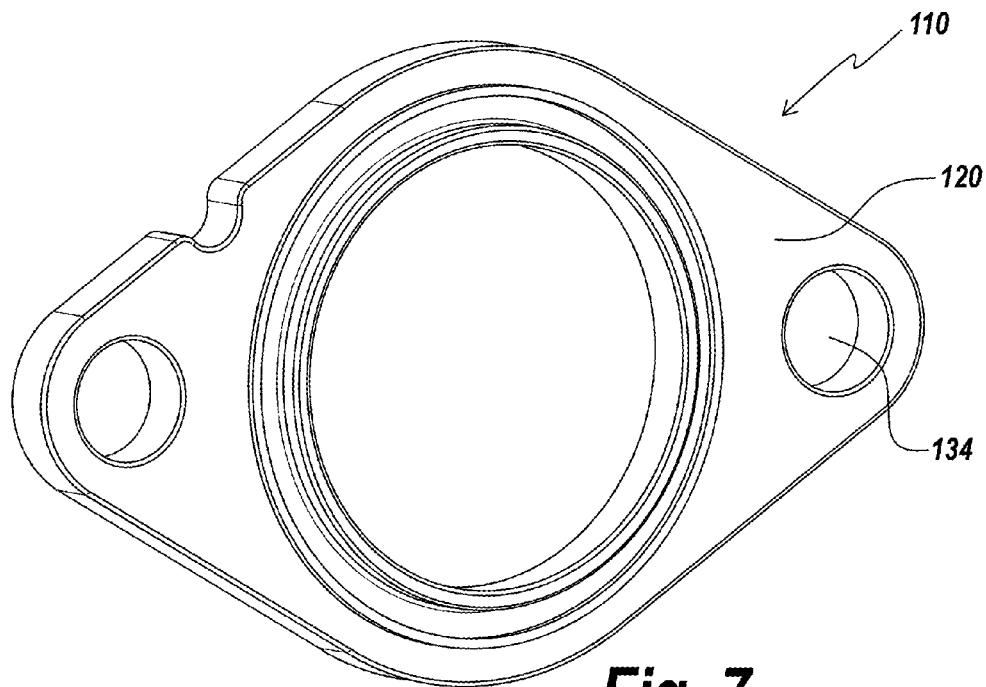
FIG. 7 is an isometric, top-view illustration of a first flange of the flange assembly of FIG. 3 having an in-die tapping, in accordance with the first exemplary embodiment of the present disclosure.
Figure 8:
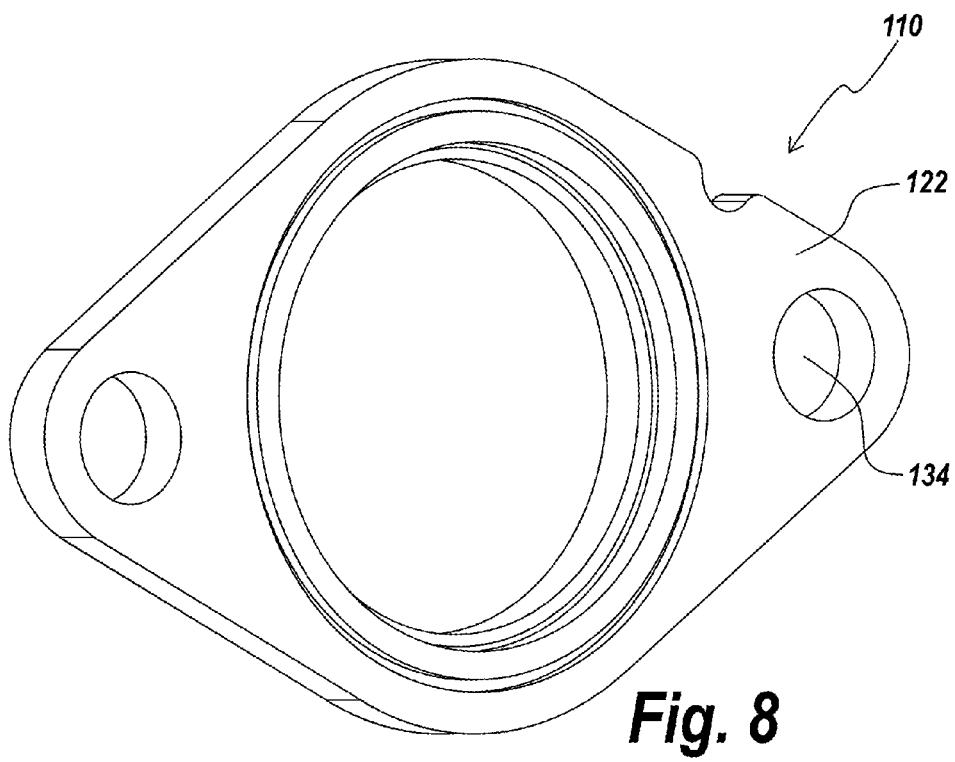
FIG. 8 is an isometric, top-view illustration of a second flange of the flange assembly of FIG. 3 having an in-die tapping, in accordance with the first exemplary embodiment of the present disclosure.

FIG. 7 is an isometric, top-view illustration of a first flange 120 of the flange assembly 110 of FIG. 3 having an in-die tapping, in accordance with the first exemplary embodiment of the present disclosure. FIG. 8 is an isometric, top-view illustration of a second flange 122 of the flange assembly 110 of FIG. 3 having an in-die tapping, in accordance with the first exemplary embodiment of the present disclosure. The receiving structure 174 (FIGS. 4-5) may be directly tapped or threaded into the first and second flanges 120, 122, wherein the receiving structure 174 is substantially embedded within a recess in one of the first and second flanges 120, 122. For example, an interior sidewall of the fastener holes 134 of the first and second flanges 120, 122 may be threaded to receive the threads of a threaded bolt. In this position, there may be no nut or other device needed to retain the bolt in a connected position between the first or second flanges 120, 122.

Figure 9:
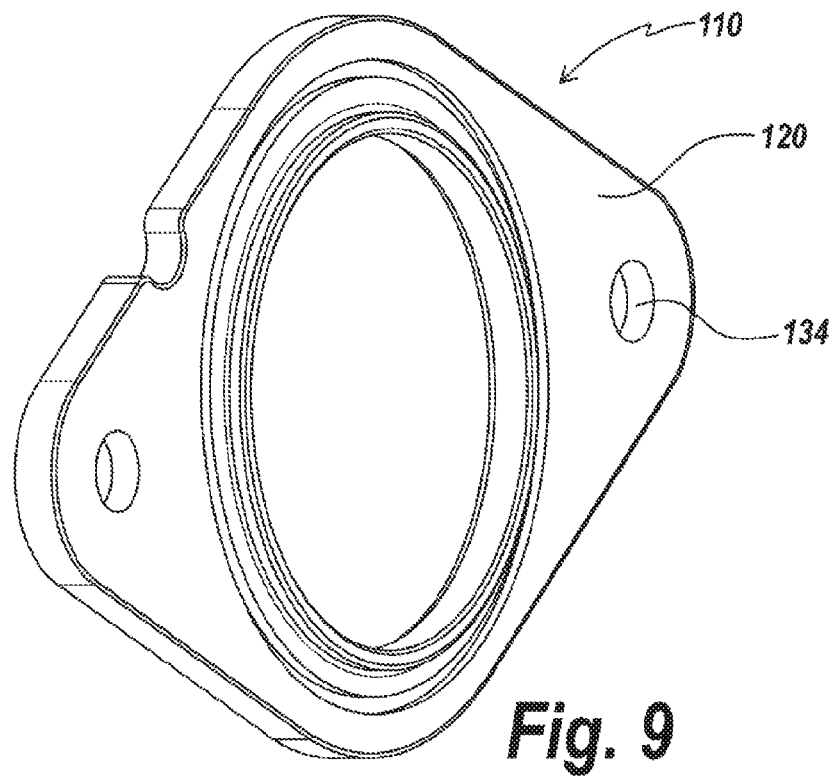
FIG. 9 is an isometric, top-view illustration of a first flange of the flange assembly of FIG. 3 having a counterbore hole, in accordance with the first exemplary embodiment of the present disclosure.
Figure 10:
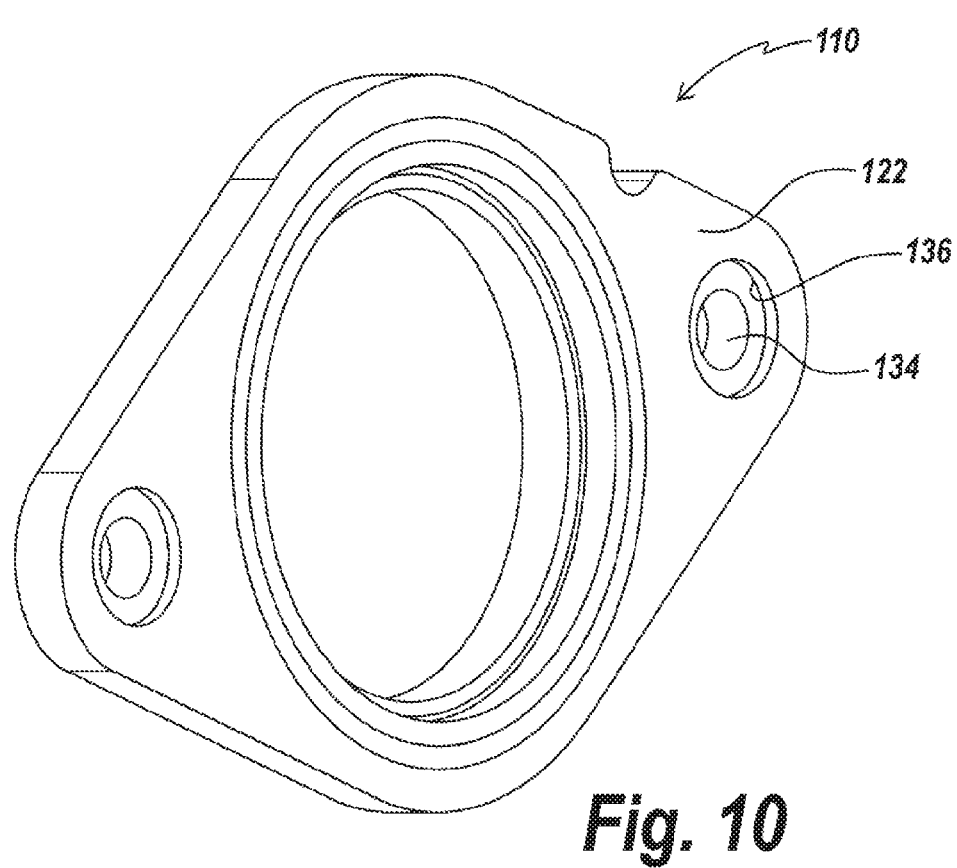
FIG. 10 is an isometric, top-view illustration of a second flange of the flange assembly of FIG. 3 having a counterbore hole, in accordance with the first exemplary embodiment of the present disclosure.

FIG. 9 is an isometric, top-view illustration of a first flange 120 of the flange assembly 110 of FIG. 3 having a counterbore hole, in accordance with the first exemplary embodiment of the present disclosure. FIG. 10 is an isometric, top-view illustration of a second flange 122 of the flange assembly 110 of FIG. 3 having a counterbore hole 136, in accordance with the first exemplary embodiment of the present disclosure. The receiving structure 174 (FIGS. 4-5) may also be a separate threaded nut which is positioned into the fastener hole 134 of the first and second flanges 120, 122. The fastener hole 134 of one or both of the first and second flanges 120, 122 may be counterbored, thereby allowing a nut to be positioned substantially flush with a top or bottom surface of either the first or second flanges 120, 122. The use of the counterbore hole 136 with a nut can be seen in FIGS. 3-5. Additionally, the use of counterbore holes can eliminate the need of the bolt pressing operation conventionally found in flange devices, which aids to lower manufacturing costs.

Figure 11:
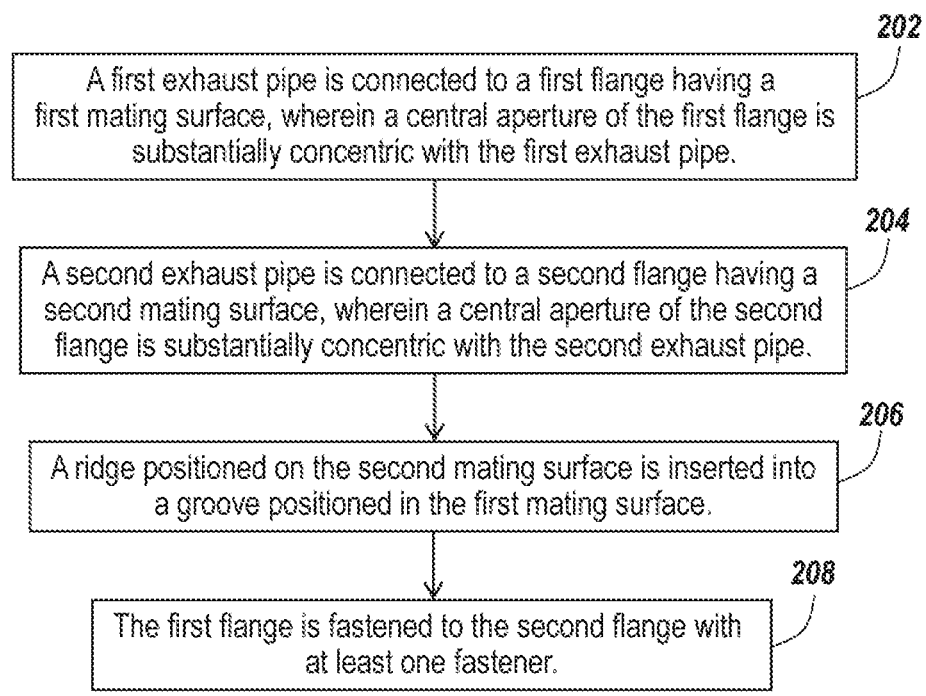
FIG. 11 is a flowchart illustrating a method of connecting two exhaust pipes together with a flange assembly, in accordance with the first exemplary embodiment of the disclosure.

FIG. 11 is a flowchart 200 illustrating a method of connecting two exhaust pipes together with a flange assembly 110, in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, a first exhaust pipe is connected to a first flange having a first mating surface, wherein a central aperture of the first flange is substantially concentric with the first exhaust pipe. A second exhaust pipe is connected to a second flange having a second mating surface, wherein a central aperture of the second flange is substantially concentric with the second exhaust pipe (block 204). A ridge positioned on the second mating surface is inserted into a groove positioned in the first mating surface (block 206). The first flange is fastened to the second flange with at least one fastener (block 208).

The method may include any number of additional steps, processes, or functions, including any disclosed herein. For example, the ridge positioned on the mating surface of the second flange may be inserted into the groove positioned in the mating surface of the first flange, which may create a seal between the first and second flanges. The engaged groove and ridge creating the seal may prevent gas emission within the first and second exhaust pipes from escaping through the engaged first and second flanges, which may prevent the emission within the first and second exhaust pipes from contacting receiving threads of the at least one fastener.

Figure 12A:
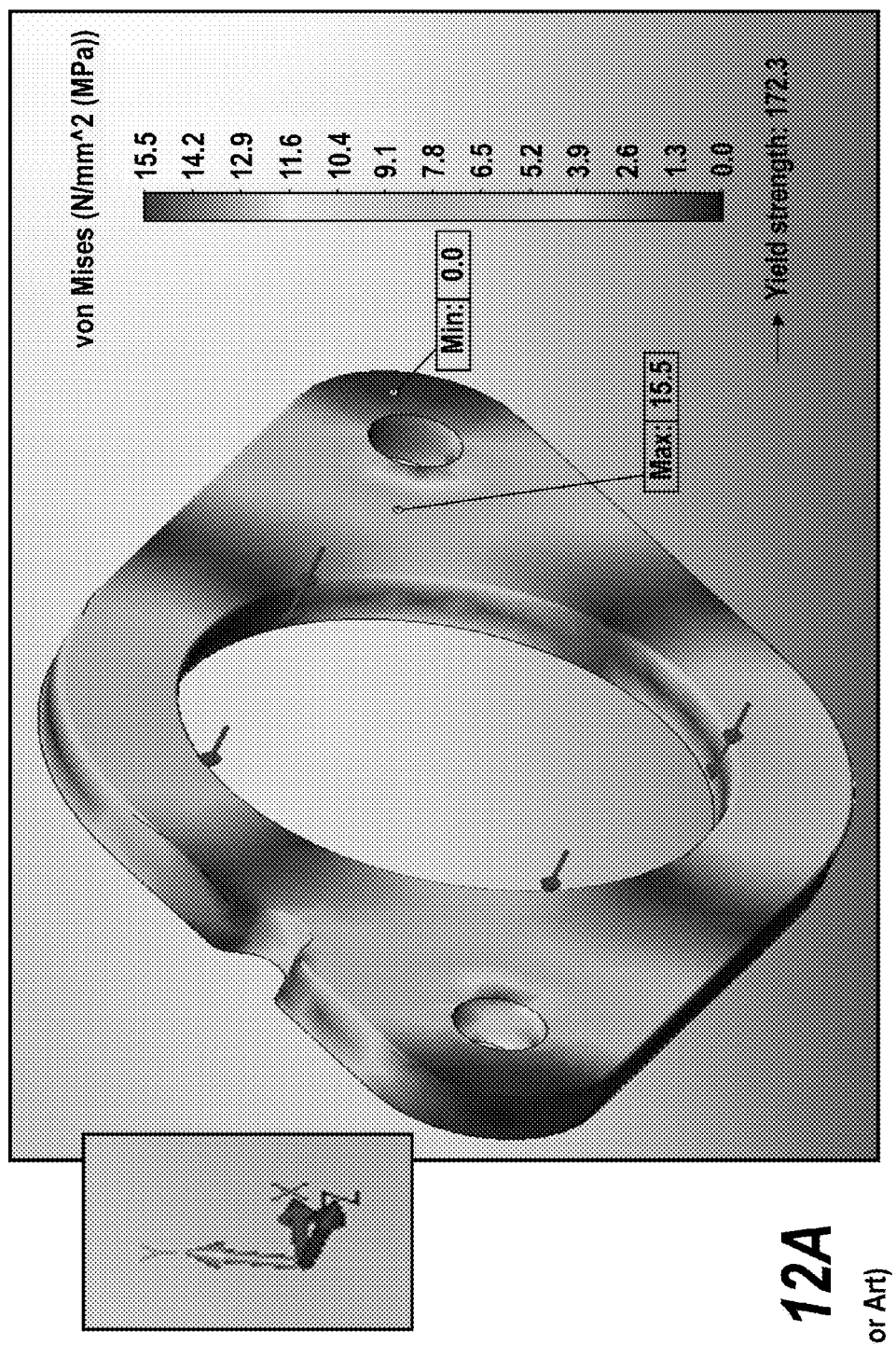
FIGS. 12A-12C are images of a von Mises finite element analysis on a prior art flange device as compared to the in-die nut flange and the counter bore flange of the flange assembly, respectively, in accordance with the first exemplary embodiment of the present disclosure.
Figure 12B:
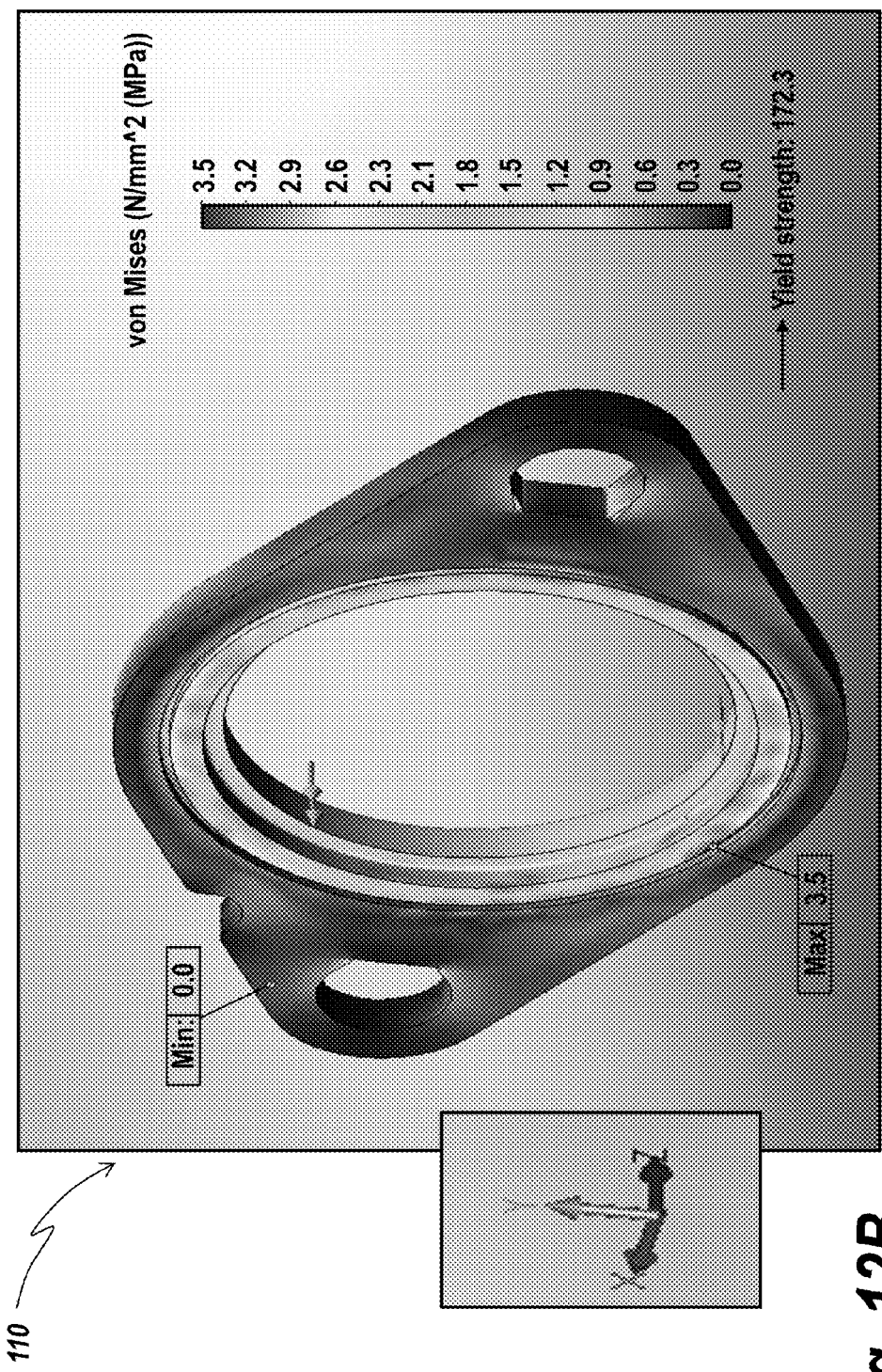
Figure 12C:
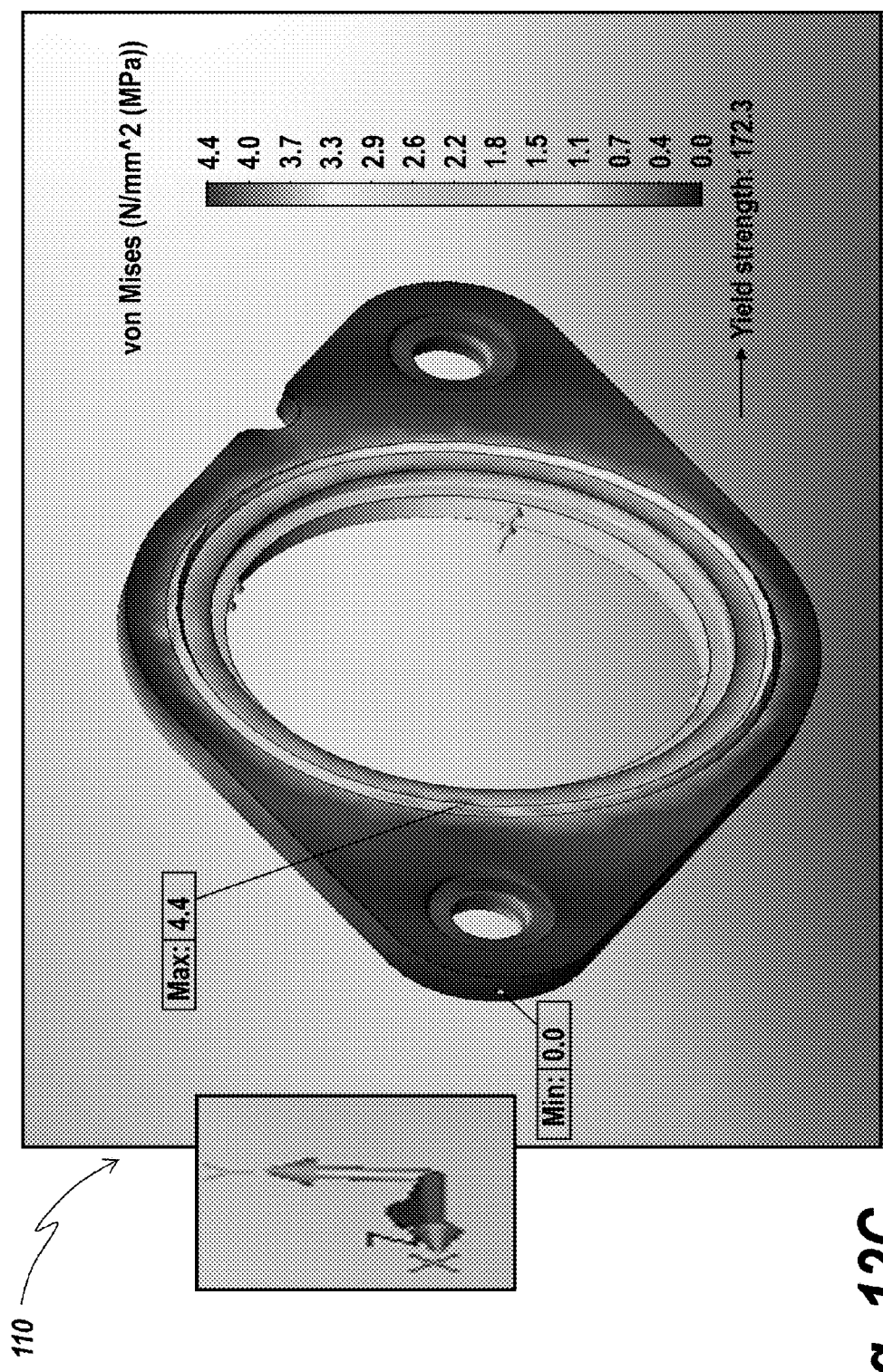
Figure 13A:
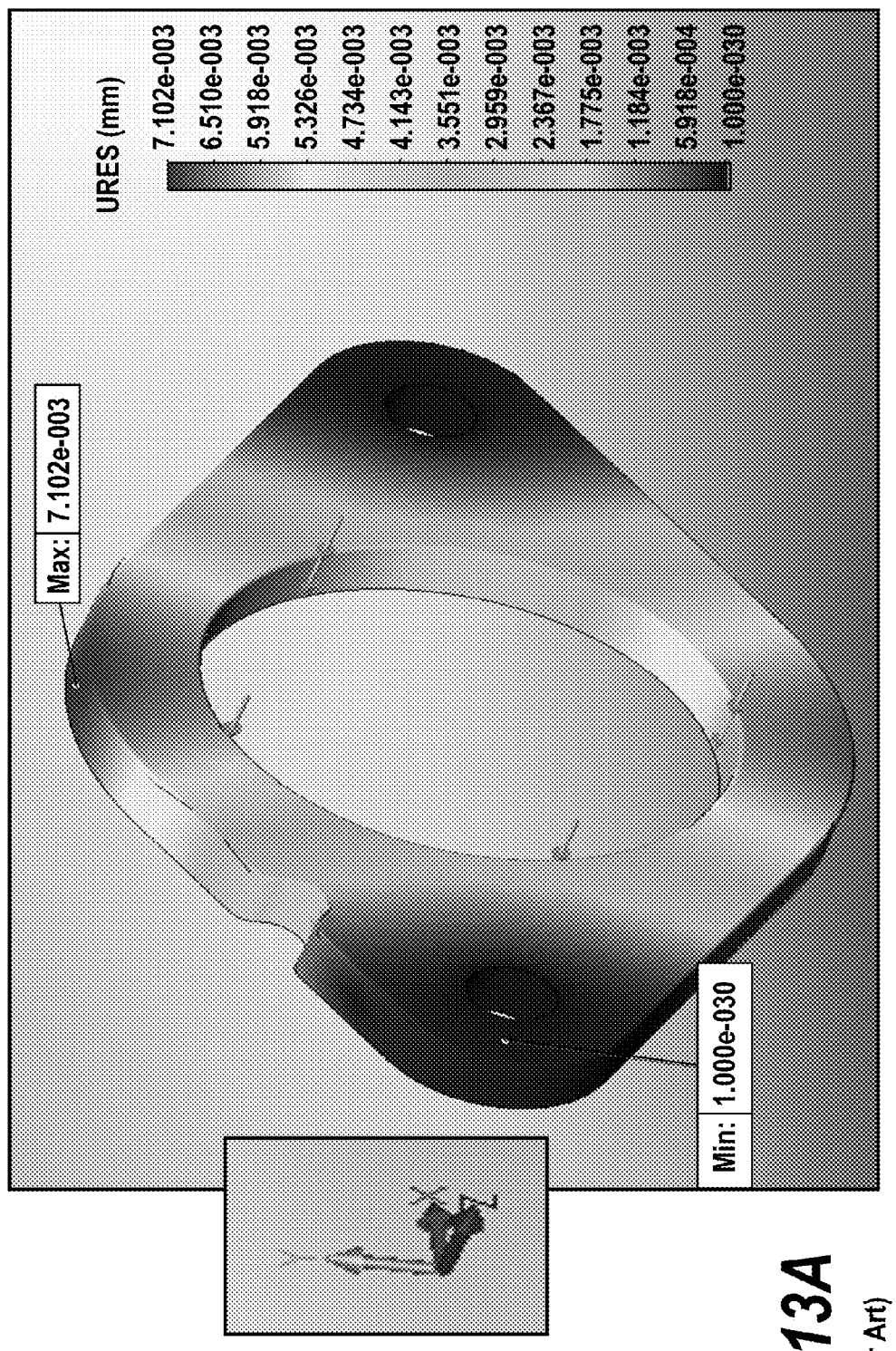
FIGS. 13A-13C are images of a displacement finite element analysis on a prior art flange device as compared to the in-die nut flange and the counter bore flange of the flange assembly, respectively, in accordance with the first exemplary embodiment of the present disclosure.
Figure 13B:
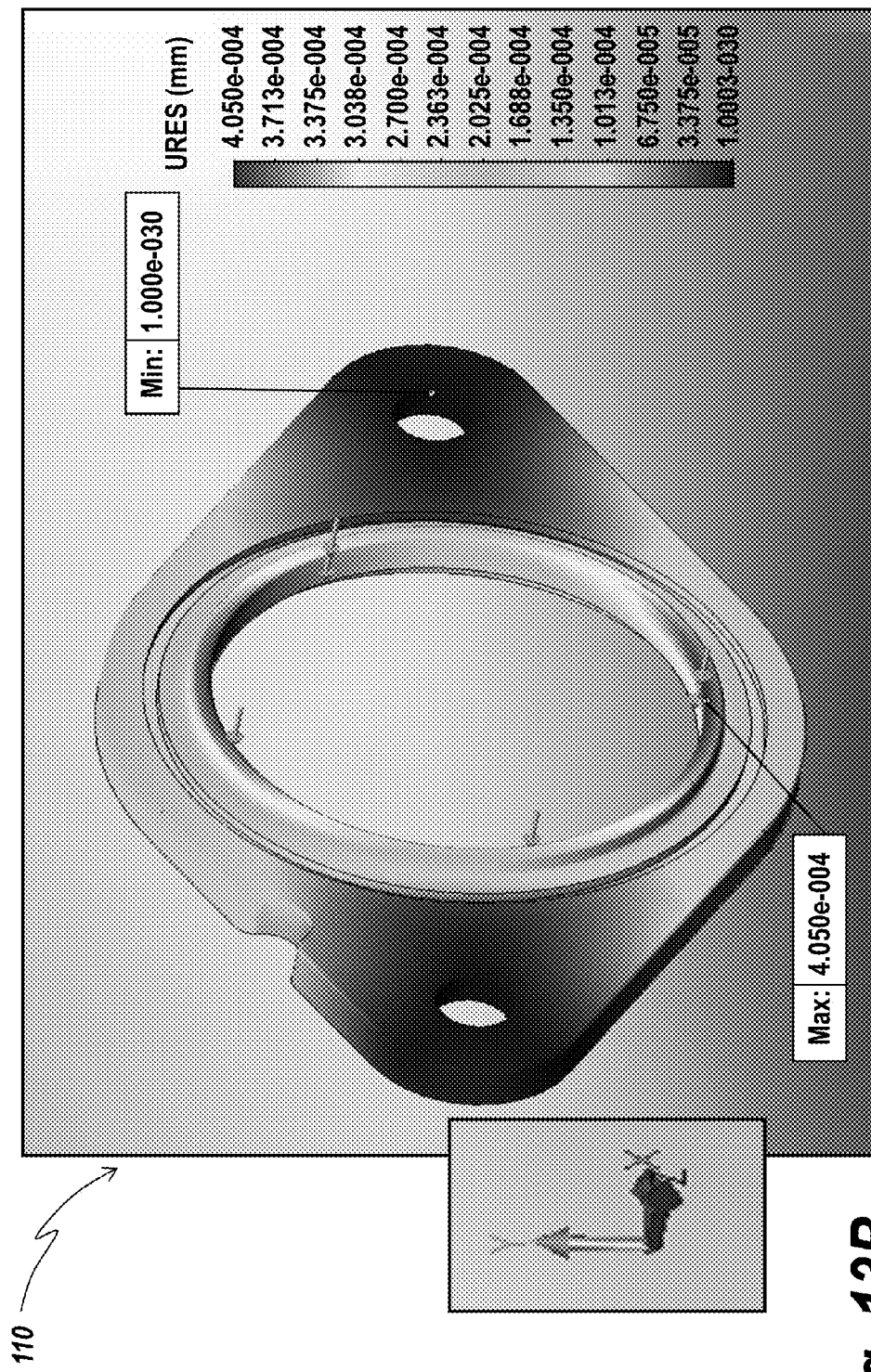
Figure 13C:
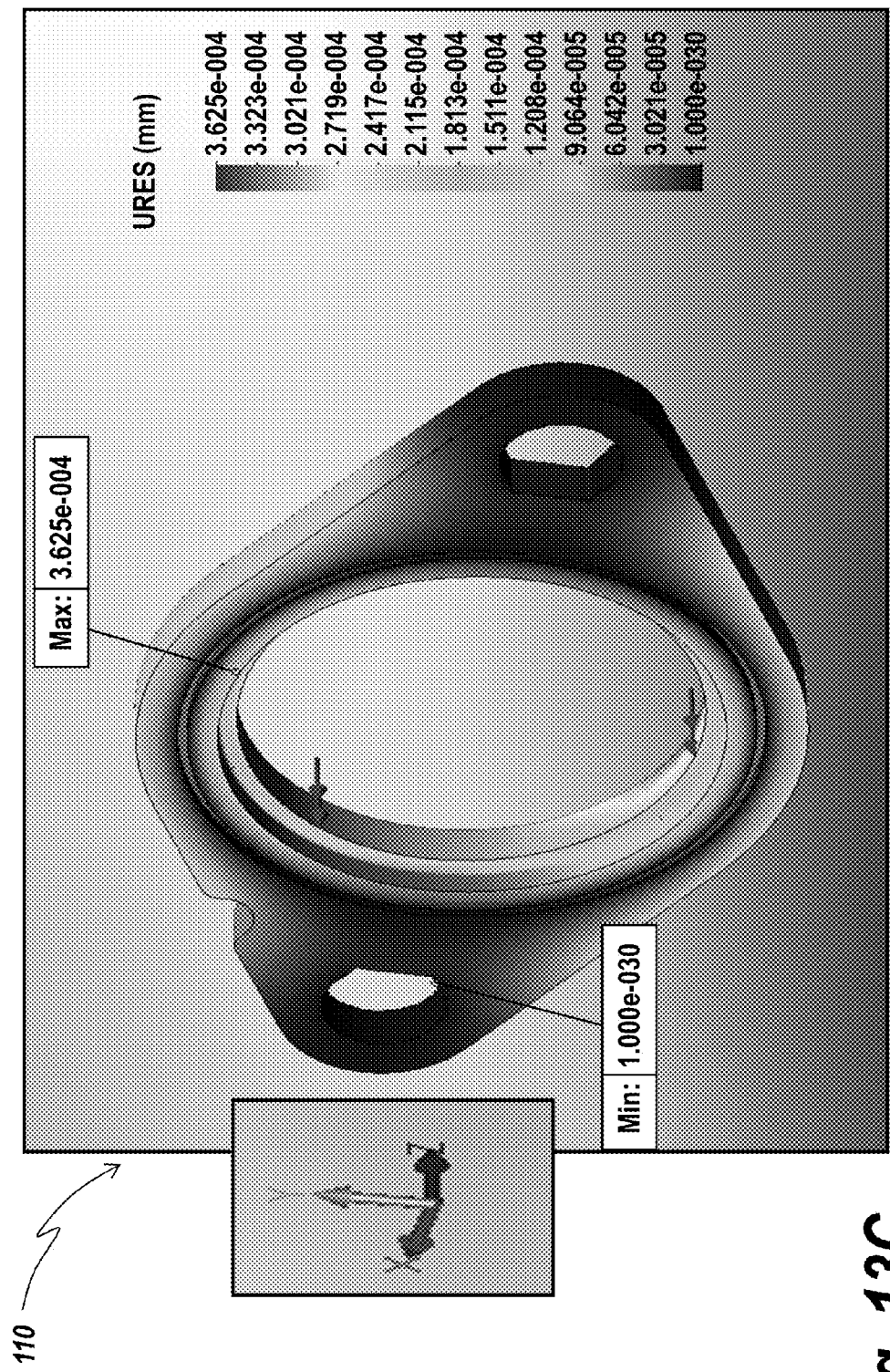
Figure 14A:
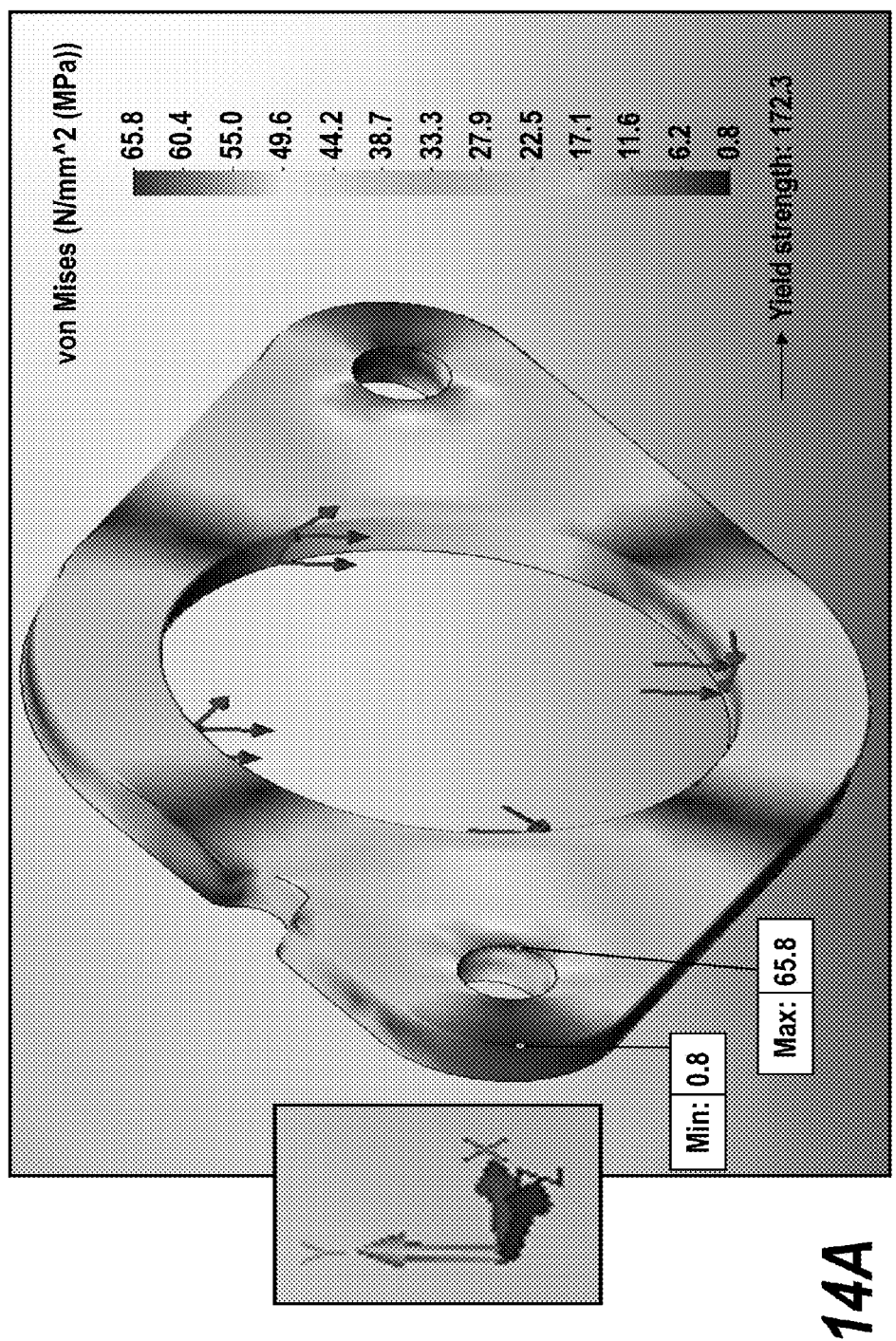
FIGS. 14A-14C are images of a von Mises finite element analysis on a prior art flange device as compared to the in-die nut flange and the counter bore flange of the flange assembly, respectively, in accordance with the first exemplary embodiment of the present disclosure.
Figure 14B:
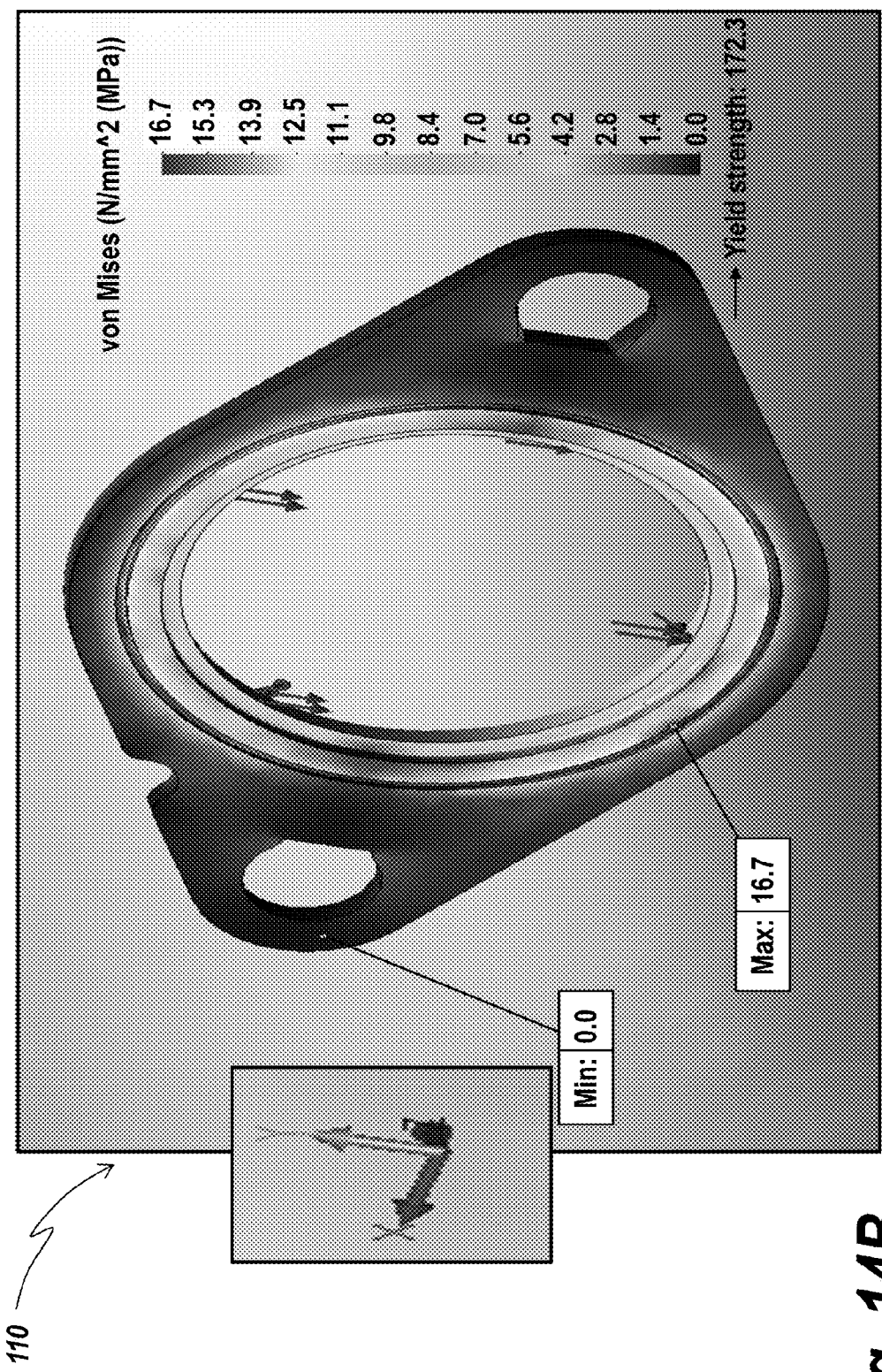
Figure 14C:
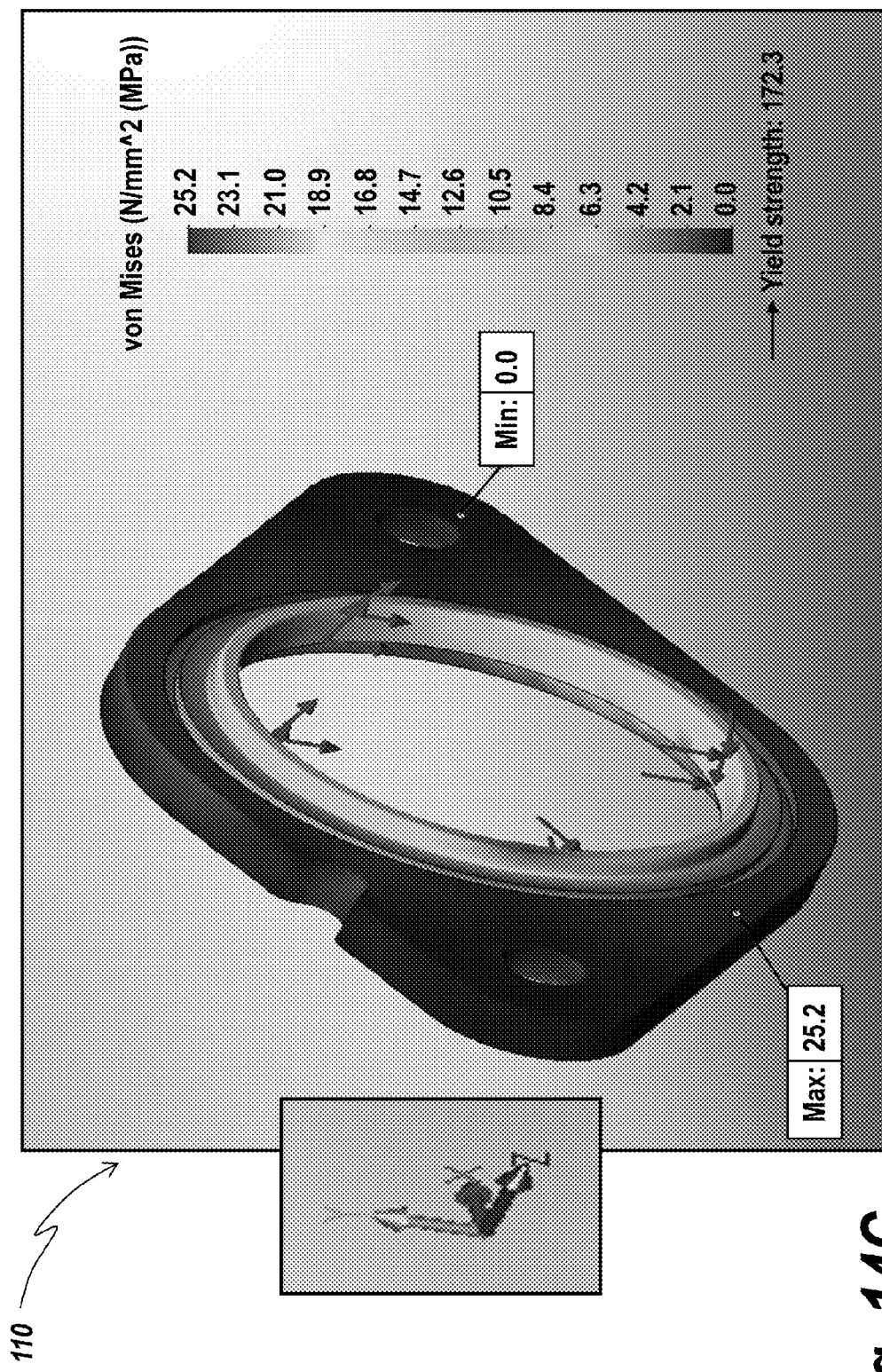
Figure 15A:
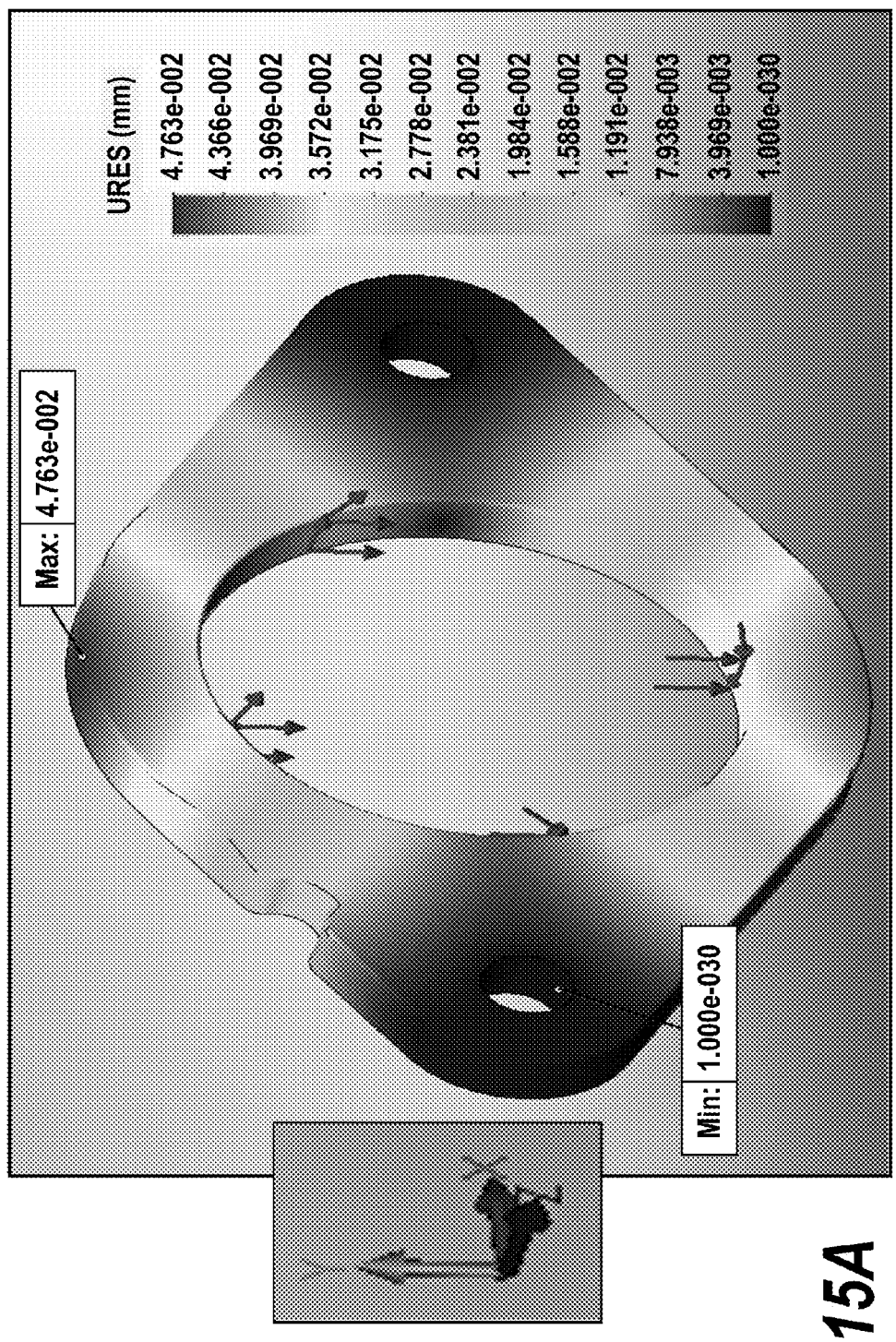
FIGS. 15A-15C are images of a displacement finite element analysis on a prior art flange device as compared to the in-die nut flange and the counter bore flange of the flange assembly, respectively, in accordance with the first exemplary embodiment of the present disclosure.
Figure 15B:
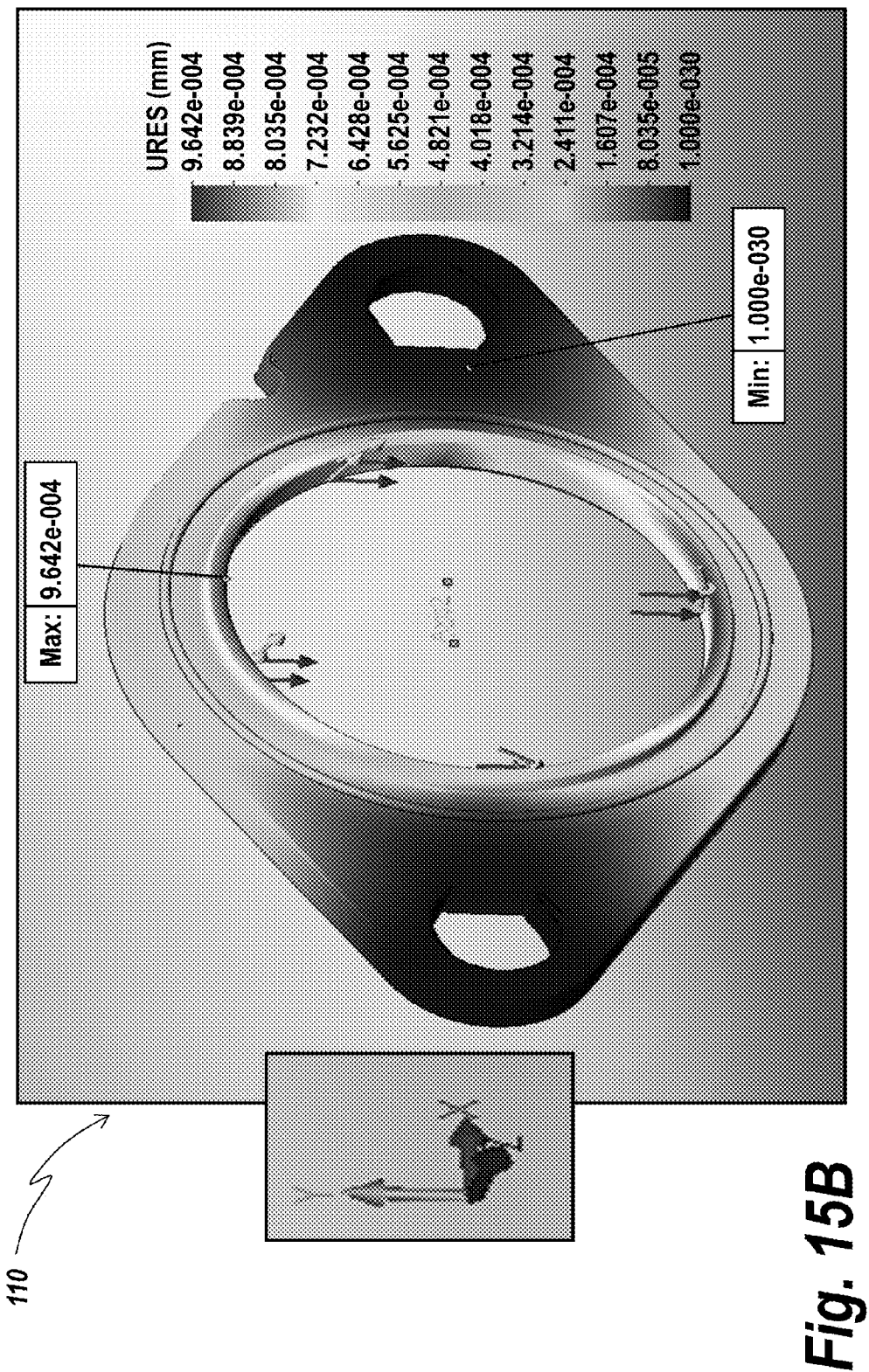
Figure 15C:
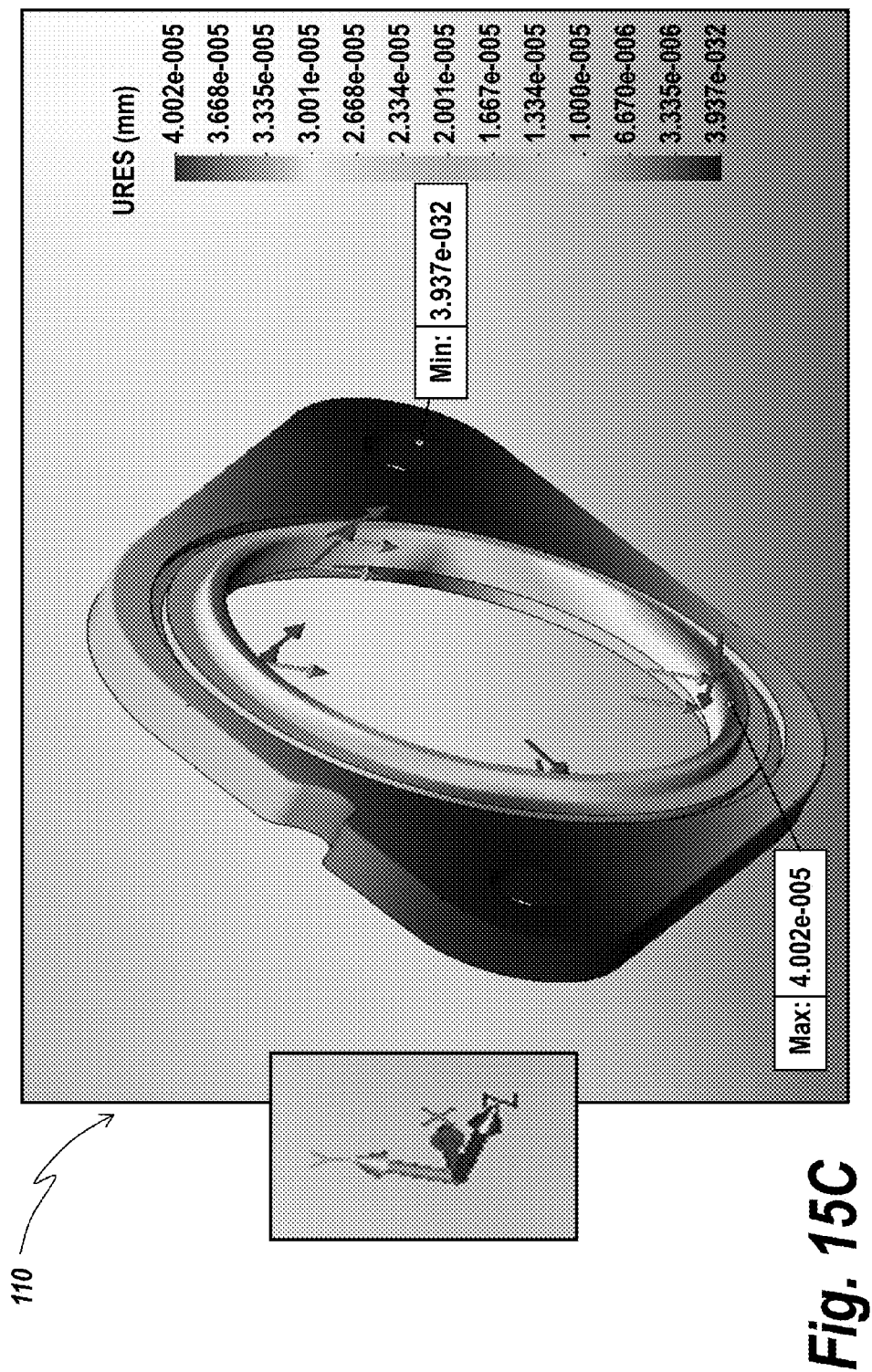

FIGS. 12A-12C are images of a von Mises finite element analysis on a prior art flange device as compared to the in-die nut flange and the counter bore flange of the flange assembly 110, respectively, in accordance with the first exemplary embodiment of the present disclosure. FIGS. 13A-13C are images of a displacement finite element analysis on a prior art flange device as compared to the in-die nut flange and the counter bore flange of the flange assembly 110, respectively, in accordance with the first exemplary embodiment of the present disclosure. FIGS. 14A-14C are images of a von Mises finite element analysis on a prior art flange device as compared to the in-die nut flange and the counter bore flange of the flange assembly 110, respectively, in accordance with the first exemplary embodiment of the present disclosure. FIGS. 15A-15C are images of a displacement finite element analysis on a prior art flange device as compared to the in-die nut flange and the counter bore flange of the flange assembly 110, respectively, in accordance with the first exemplary embodiment of the present disclosure.

FIGS. 12A-16B provide relative comparisons, using finite element analysis, of a prior art flange device relative to the flange assembly 110. In the comparisons, each item was subjected to a load of 74.187 lbf (330 N), with an actual exhaust assembly weight of 37 lbs, a moment of 321.229 lbf-in (36,300 N-mm) with a distance load applied away from flange assembly of 4.330 in (110 mm), with flanges fixed at bolt/nut holes, and with the load acting on an internal diameter (ID) of the hole. In FIGS. 12A-12C, the front load was applied in the Z direction to produce the resultant von Mises analysis shown. In FIGS. 13A-13C, the front load was applied in the Z direction to produce the resultant displacement analysis shown. In FIGS. 14A-14C, the load is representative of the stresses acting on the internal diameter of the flange caused by the force of the exhaust pipe pulling down on the flange to produce the resultant von Mises analysis shown. In FIGS. 15A-15C, the load is representative of the stresses acting on the internal diameter of the flange caused by the force of the exhaust pipe pulling down on the flange to produce the resultant displacement analysis shown.

Figure 16A:
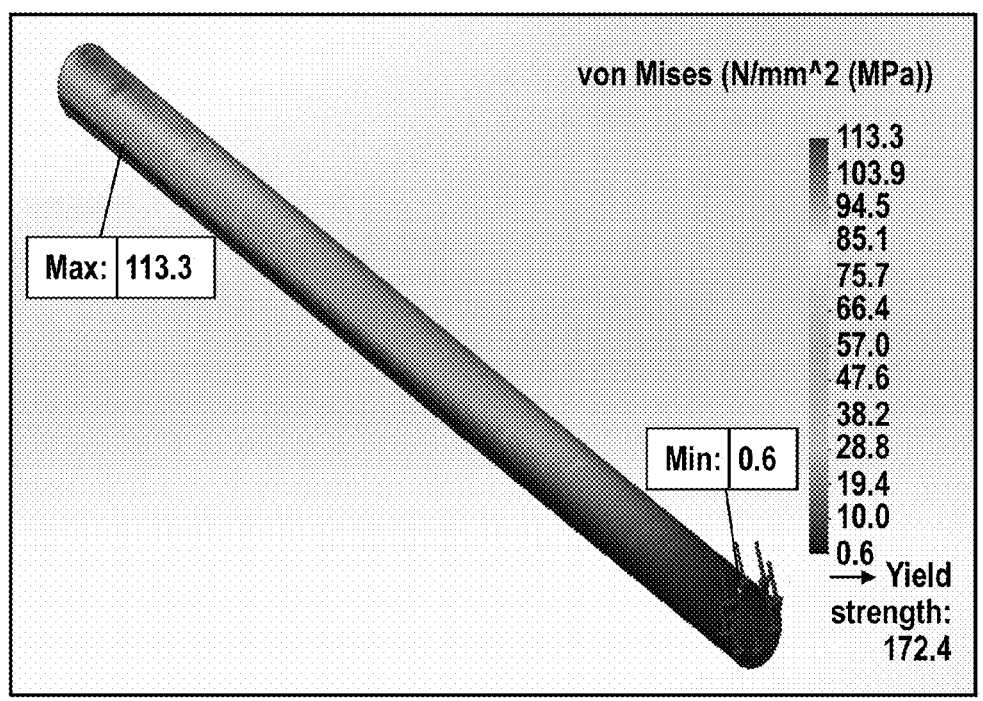
FIGS. 16A-16B are images of a von Mises finite element analysis and displacement finite element analysis on an exhaust pipe having the flange assembly connected thereto, in accordance with the first exemplary embodiment of the present disclosure.
Figure 16B:
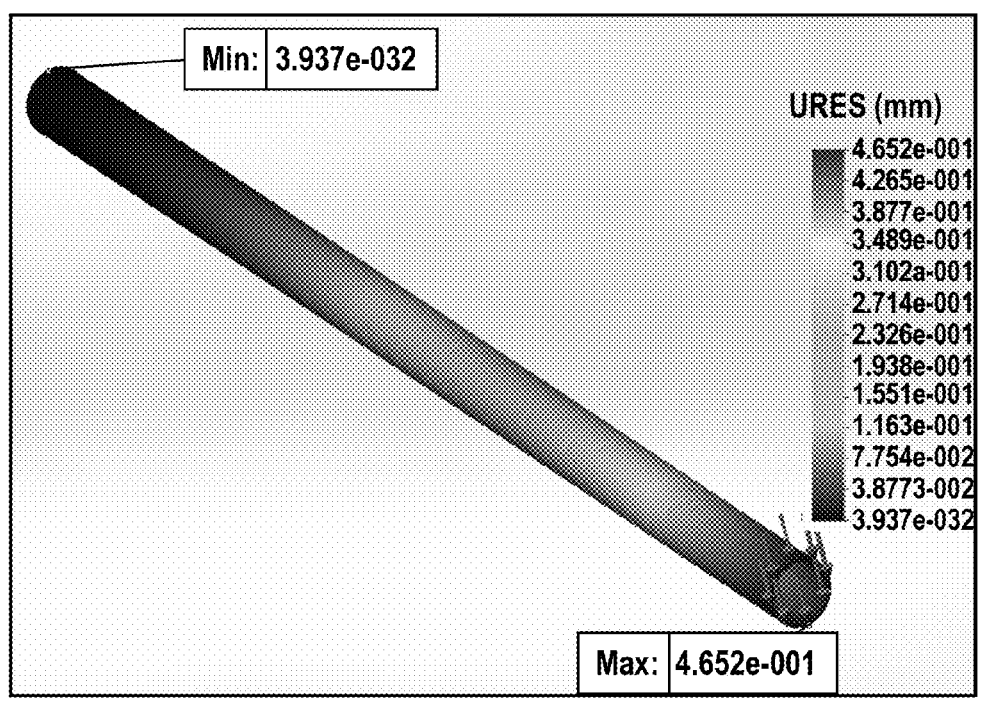

FIGS. 16A-16B are images of a von Mises finite element analysis and displacement finite element analysis on an exhaust pipe having the flange assembly 110 connected thereto, in accordance with the first exemplary embodiment of the present disclosure. In this example, a 52 inch exhaust pipe was used, which may be equivalent to a pipe length after a support and without bend in the pipe. A load of 74.187 lbf (330 N) was applied on the exhaust pipe prior to the support and flange that is being evaluated. The pipe exhibited a greater stress value than the flange, as is shown in the von Mises analysis of FIG. 16A and the displacement analysis of FIG. 16B.

Figure 17:
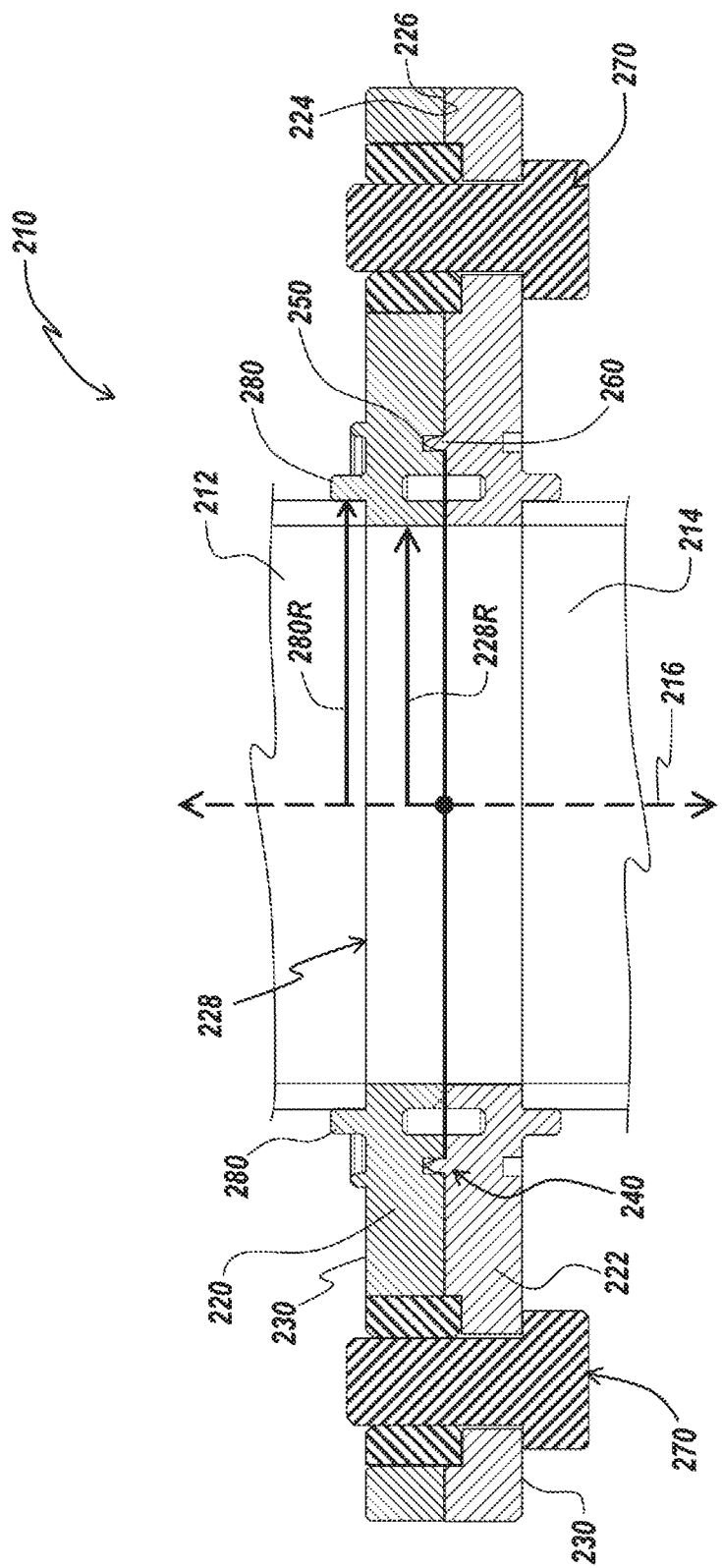
FIG. 17 is a cross-sectional side view illustration of a flange assembly, in accordance with a second exemplary embodiment of the present disclosure.

FIG. 17 is a cross-sectional side view illustration of a flange assembly 210, in accordance with a second exemplary embodiment of the present disclosure. The flange assembly 210, which may be referred to herein as 'assembly 210', may be substantially similar to the assembly 110 of the first exemplary embodiment and may include any of the components, features, or functions discussed relative to the first exemplary embodiment. The assembly 210 includes a first flange 220 and a second flange 222. A sealing structure 240 is positioned between a first mating faces 224 and a second mating face 226 of the first and second flanges 220, 222. The sealing structure 240 comprises a groove 250 positioned on the first mating face 224 and a ridge 260 positioned in the second mating face 226. The ridge 260 engages with the groove 250 by occupying at least a portion of the groove 250 when the first and second flanges 220, 222 are connected.

The groove 250 and ridge 260 of the sealing structure 240 may allow for a seal to be formed between the exhaust pipes 212, 214, such that exhaust gases traveling through exhaust pipes 212, 214 cannot escape or leak out of the flange assembly 210. Accordingly, the seal may be a gas-tight seal formed by the mating of the groove 250 and the ridge 260 encapsulating a portion of the central aperture 228. Thus, the use of the sealing structure 240 may substantially increase the ability of the exhaust system to properly expel the exhaust gases without experiencing leaks therein. These leaks within the exhaust system can be pollutant in nature and can often be detrimental to the health of occupants within a cabin of a car if the exhaust leak is emitted into the cabin.

Additionally, the each of the first and second flanges 220, 222 may include a tubular extension 280 positioned on a non-mating face 230 of each of the first and second flanges 220, 222. The tubular extension 280 may allow for a better weld to be created between an end of the exhaust pipes 212, 214 and the flange assembly 210, which increases the integrity of the flange assembly 210 while reducing its weight, such as, for example, by reducing the weld size. A reduction in weld size and the ability of the tubular extension 280 to locate the weld a slight distance from the non-mating face 230 of the first and second flanges 220, 222 may promote a reduction in residual stresses which are known to cause distortion in flanges.

The tubular extension 280 may be positioned between the central aperture 228 and the sealing structure 240, as is shown in FIG. 17 and/or it may be positioned set back from an innermost portion of the first and second flanges 220, 222 that forms a sidewall of the central aperture 228. This set back positioning may create a ledge on each of the first and second flanges 220, 222 which an end of each of the exhaust pipes 212, 214 can be located. In this position, an inner diameter of each of the exhaust pipes 212, 214 may be approximately equal to the internal diameter of the central aperture 228 and the outer diameter of each of the exhaust pipes 212, 214 may be approximately equal to the inner diameter of the tubular extension 280. Accordingly, the inner sidewalls of the exhaust pipes 212, 214 may be substantially aligned with the sidewall of the central aperture 228 with the outer surface of the exhaust pipes 212, 214 abutting the tubular extension 280. The radial dimension of the tubular extension 280R may be greater than the radial dimension of the central aperture 228R, as indicated in FIG. 17 relative to the central axis 216. The terminating end or base of the exhaust pipes 212, 214 may be coincident to the non-mating surface 230 of the first and second flanges 220, 222. At least one fastener 270, commonly two fasteners 270 as shown, is connected between the first and second flanges 220, 222 and may hold the first and second flanges 220, 222 together in an engaged position. A given fastener 270 may be of any of the example configurations of a fastener 170, discussed above.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A flange assembly comprising:
   a first flange having:
      a first mating face having at least one groove defined therein at least partially about a first central aperture of the first flange; and
      a first face located opposite the first mating face and having:
         a first tubular extension extending therefrom and configured to engage an exterior of a first pipe when that first pipe is coupled with the first central aperture of the first flange; and
         at least one ridge defined thereat at least partially about the first central aperture and the first tubular extension;
   a second flange having:
      a second mating face having at least one ridge defined thereat at least partially about a second central aperture of the second flange; and
      a second face located opposite the second mating face and having:
         a second tubular extension extending therefrom and configured to engage an exterior of a second pipe when that second pipe is coupled with the second central aperture of the second flange; and
         at least one groove defined therein at least partially about the second central aperture and the second tubular extension;
   wherein the first and second flanges are configured to interface with one another such that the at least one ridge of the second mating face of the second flange at least partially occupies the at least one groove of the first mating face of the first flange.

2. The flange assembly of claim 1, wherein:
   the at least one groove comprises:
      a first groove; and
      a second groove arranged concentrically with the first groove;
   the at least one ridge comprises:
      a first ridge; and
      a second ridge arranged concentrically with the first ridge; and
   the first and second flanges are configured to interface with one another such that:
      the first ridge of the second flange at least partially occupies the first groove of the first flange in a manner providing a first gas-tight seal; and
      the second ridge of the second flange at least partially occupies the second groove of the first flange in a manner providing a second gas-tight seal.

3. The flange assembly of claim 1, wherein:
   the at least one groove is defined in the first mating face entirely about the first central aperture of the first flange; and
   the at least one ridge is defined in the second mating face entirely about the second central aperture of the second flange.

4. The flange assembly of claim 1, wherein the at least one ridge is of either:
   rectangular cross-sectional geometry; or
   rounded triangular cross-sectional geometry.

5. The flange assembly of claim 1, wherein at least one of:
   a radial dimension of the first tubular extension is greater than a radial dimension of the first central aperture such that the first tubular extension is radially offset from an inner sidewall of the first central aperture in a manner providing a first ledge on which an end of the first pipe can be seated when that first pipe is coupled with the first central aperture of the first flange; and
   a radial dimension of the second tubular extension is greater than a radial dimension of the second central aperture such that the second tubular extension is radially offset from an inner sidewall of the second central aperture in a manner providing a second ledge on which an end of the second pipe can be seated when that second pipe is coupled with the second central aperture of the second flange.

6. The flange assembly of claim 1, wherein at least one of:
the first central aperture extends radially under the first tubular extension of the first flange; and
the second central aperture extends radially under the second tubular extension of the second flange.

7. The flange assembly of claim 1, further comprising at least one fastener connecting the first and second flanges.

8. The flange assembly of claim 7, wherein:
the at least one fastener comprises a threaded bolt and a receiving nut;
at least one of the first and second flanges further comprises a counterbore hole; and
the receiving nut is configured to be positioned within the counterbore hole.

9. The flange assembly of claim 7, wherein the at least one fastener comprises:
a threaded bolt; and
a receiving structure substantially embedded within a recess in one of the first and second flanges.

10. The flange assembly of claim 1, wherein:
the first flange is configured such that when the first pipe is coupled with the first central aperture, the first pipe is coincident with the first surface; and
the second flange is configured such that when the second pipe is coupled with the second central aperture, the second pipe is coincident with the second surface.

11. The flange assembly of claim 10, wherein the at least one ridge of the first face is longitudinally and radially offset from the at least one ridge of the second mating face.

12. The flange assembly of claim 1, wherein each of the first and second flanges has a thickness dimension of not more than 7.0 mm.

13. The flange assembly of claim 1, wherein at least one of the first and second tubular extensions has a thickness dimension that substantially matches a wall thickness of at least one of the first pipe and second pipe.

14. An exhaust flange apparatus comprising:
a first flange having a first central aperture at least partially surrounded by a first tubular extension, wherein a first exhaust pipe is connectable to the first tubular extension of the first flange with a central axis of the first exhaust pipe positioned substantially concentric with a central axis of the first central aperture;
a second flange having a second central aperture at least partially surround by a second tubular extension, wherein a second exhaust pipe is connectable to the second tubular extension of the second flange with a central axis of the second exhaust pipe positioned substantially concentric with a central axis of the second central aperture;
a plurality of sealing structures interfaced between mating faces of the first and second flanges, wherein each of the plurality of sealing structures has a groove positioned on one of the first and second flanges and a ridge positioned on another of the first and second flanges, wherein each of the plurality of sealing structures is positioned at least partially around the first and second central apertures of the first and second flanges, respectively;
at least one ridge provided on a first non-mating face of one of either the first or second flange;
at least one groove provided on a second non-mating face of another of either the first or second flange; and
at least one fastener connecting the first and second flanges.

15. The exhaust flange apparatus of claim 14, wherein at least one of:
the first tubular extension is offset from the first central aperture in a manner providing a first recessed ledge on which the first exhaust pipe can be seated; and
the second tubular extension is offset from the second central aperture in a manner providing a second recessed ledge on which the second exhaust pipe can be seated.

16. The exhaust flange apparatus of claim 14, wherein each of the first and second flanges has a thickness dimension of not more than 7.0 mm.

17. A method of connecting two exhaust pipes together with a flange assembly, the method comprising:
connecting a first exhaust pipe to a first tubular extension of a first flange having a first mating surface including at least two grooves positioned therein, and a first surface opposite the first mating surface and including at least one ridge positioned thereon, wherein a first central aperture of the first flange is substantially concentric with the first exhaust pipe;
connecting a second exhaust pipe to a second tubular extension of a second flange having a second mating surface including at least two ridges positioned thereon, and a second surface opposite the second mating surface and including at least one groove positioned therein, wherein a second central aperture of the second flange is substantially concentric with the second exhaust pipe;
inserting, respectively, the at least two ridges of the second mating surface into the at least two grooves of the first mating surface; and
fastening the first flange to the second flange with at least one fastener.

18. The method of claim 17, wherein inserting the at least two grooves into the at least two ridges, respectively, comprises creating at least two gas-tight seals between the first and second flanges.

19. The method of claim 18, wherein the at least two gas-tight seals at least partially encapsulate a portion of the first and second central apertures.

20. The method of claim 18, further comprising preventing gas emission within the first and second exhaust pipes from contacting receiving threads of the at least one fastener.

* * * * *